(12) United States Patent
Suzuki et al.

(10) Patent No.: US 9,162,425 B2
(45) Date of Patent: Oct. 20, 2015

(54) SOLAR CONTROL GLASS AND SOLAR CONTROL DOUBLE GLASS

(75) Inventors: Yuji Suzuki, Yokohama (JP); Hiroshi Nakamura, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 698 days.

(21) Appl. No.: 13/380,780

(22) PCT Filed: Jun. 24, 2010

(86) PCT No.: PCT/JP2010/060711
§ 371 (c)(1),
(2), (4) Date: Dec. 23, 2011

(87) PCT Pub. No.: WO2010/150839
PCT Pub. Date: Dec. 29, 2010

(65) Prior Publication Data
US 2012/0092759 A1    Apr. 19, 2012

(30) Foreign Application Priority Data

Jun. 24, 2009 (JP) ................................ 2009-149332
Aug. 7, 2009 (JP) ................................ 2009-184047
Aug. 31, 2009 (JP) ................................ 2009-199678
Jun. 8, 2010 (JP) ................................ 2010-130694

(51) Int. Cl.
*F21V 9/04* (2006.01)
*B32B 17/10* (2006.01)
*G02B 5/20* (2006.01)
*C03C 17/34* (2006.01)
*E06B 3/67* (2006.01)

(52) U.S. Cl.
CPC ........... *B32B 17/10018* (2013.01); *B32B 17/10* (2013.01); *B32B 17/10055* (2013.01);
(Continued)

(58) Field of Classification Search
CPC ................ B32B 17/10055; B32B 17/10633; G02B 5/282; G02B 1/04; G02B 5/0808; G02B 5/204; G02B 5/08; G02B 5/287; G02B 5/124; G02B 5/26; G02B 5/281; C03C 17/366; C03C 17/36; C03C 17/3681; C03C 17/3639; C03C 17/3618; C03C 17/3417; C03C 17/3435; C03C 17/3626; C03C 17/3411; C03C 2217/70; C03C 17/3613; C03C 2217/29; H05K 9/0005; E06B 3/6612; E06B 3/66304; E06B 3/66; E06B 3/6715; E06B 2003/6638; E06B 2003/6264; E06B 2003/66338; E06B 5/18
See application file for complete search history.

(56) References Cited

U.S. PATENT DOCUMENTS 4,963,206 A * 10/1990 Shacklette et al. .............. 156/99
2006/0008640 A1    1/2006 Chonan

FOREIGN PATENT DOCUMENTS

DE    42 26 757 A1    2/1994
EP    1013413 A    6/2000
(Continued)

OTHER PUBLICATIONS

English machine translation of JP 2003-104758 A.*
(Continued)

*Primary Examiner* — Derek S Chapel
(74) *Attorney, Agent, or Firm* — Sughrue Mion, PLLC

(57) ABSTRACT

A heat-ray shielding glass products (e.g., solar control double glass) which have excellent heat-ray shielding property, especially thermal insulation property and enhanced durability under the condition of existence of moisture (under high humidity), and which can be prepared in low cost is provided. The solar control double glass 40 comprises a solar control glass 30 having a glass plate 21 and a heat-ray reflection layer 24 comprising an electrically-conductive polymer provided thereon and another glass plate 37, the solar control glass and the another glass being arranged at an interval such that the heat-ray reflection layer faces the another glass and the interval forming a hollow layer 38, and the heat-ray reflection layer 24 has a surface resistivity of not more than 10,000Ω/□.

8 Claims, 5 Drawing Sheets

(52) U.S. Cl.
CPC ..... *B32B17/10174* (2013.01); *B32B 17/10633* (2013.01); *B32B 17/10697* (2013.01); *B32B 17/10788* (2013.01); *C03C 17/3405* (2013.01); *E06B 3/6715* (2013.01); *G02B 5/208* (2013.01); *B32B 2367/00* (2013.01)

(56) References Cited

FOREIGN PATENT DOCUMENTS

| | | |
|---|---|---|
| JP | 2001-226148 A | 8/2001 |
| JP | 2003-104758 A | 4/2003 |
| JP | 2005-288867 A | 10/2005 |
| JP | 2007-070146 A | 3/2007 |
| JP | 2007-269523 A | 10/2007 |
| JP | 2008-026493 A | 2/2008 |
| JP | 2009035459 A | 2/2009 |

OTHER PUBLICATIONS

English machine translation of DE 4226757 A1.*
European Search Report dated Dec. 12, 2013.issued in European Patent Application No. 10792157.9.

* cited by examiner

SOLAR CONTROL GLASS AND SOLAR CONTROL DOUBLE GLASS

CROSS REFERENCE TO RELATED APPLICATIONS

This application is a National Stage of International Application No. PCT/JP2010/060711 filed Jun. 24, 2010, claiming priority based on Japanese Patent Application No. 2009-149332 filed Jun. 24, 2009, Japanese Patent Application No. 2009-184047 filed Aug. 7, 2009, Japanese Patent Application No. 2009-199678 filed Aug. 31, 2009, Japanese Patent Application No. 2010-130694 filed Jun. 8, 2010, the contents of all of which are incorporated herein by reference in their entirety.

TECHNICAL FIELD

The present invention relates to a solar control glass having heat-ray shielding property or heat-ray reflection property, and a solar control double glass using the solar control glass.

BACKGROUND OF THE ART

In order to reduce the air-conditioning loads of buildings, vehicles such as bus and automobile, and rail cars such as electric car, the windows mounted these buildings or vehicles heretofore have required the functions of shielding near infrared ray (heat-ray) in the solar light and of insulating heat by reflecting heat-ray emitted from inside of a room. As glasses shielding or reflecting heat-ray, a heat-ray adsorbing glass obtained by introducing ions such as Fe, Cr and Ti by kneading action to add heat-ray adsorbing property to a glass, a heat-ray reflecting glass having metal oxide film formed by deposition, a heat-ray reflecting glass having a transparent thin film of indium-tin oxide (ITO) or tin oxide (ATO) formed by dry-plating, and a heat-ray shielding glass having a heat-ray shielding film (also referred to as Low-E film) obtained by lamination of a noble metal film/metal oxide film mainly consisting of metal oxide film/Ag film (Patent Document 1), have been developed, and put to practical use. Of these glasses or films, the Low-E film has functions (thermal insulation properties) of transmitting near infrared ray of the solar light (having relative short wavelength) and reflecting far infrared ray emitted from inside of a room (heater) to prevent the heat of the ray from escaping.

As these glasses shielding heat-ray (i.e., solar control glass), especially the glass having the Low-E film, a double glass having the structure that the glass shielding or reflecting heat-ray and another glass are arranged at a predetermined interval (through an air layer) such that these glasses face each other has been developed in order to improve thermal insulation property (Patent Document 2). Thereby, energy consumed by cooling and heating can be further reduced.

Further, a solar control glass enhanced in thermal insulation property and visible light transmittance, in which a coating layer comprising a particle of tungsten oxide and/or composite tungsten oxide (hereinafter referred to as (composite) tungsten oxide) and an UV-excitation color protection agent is formed on a glass plate, has been developed (Patent Document 3).

Further, it is known that the property absorbing infrared ray is found in an electrically-conductive polymer. Therefore, a transparent heat-shielding film comprising a surface protection layer, a heat-shielding layer containing the electrically-conductive polymer, a substrate, an ultraviolet ray absorbing layer and an adhesive layer has been developed (Patent Document 4).

PRIOR ART DOCUMENTS

Patent Document

Patent Document 1: JP2001-226148 A
Patent Document 2: JP2007-70146 A
Patent Document 3: JP2007-269523 A
Patent Document 4: JP2005-288867 A

SUMMARY OF THE INVENTION

Problem to be Solved by the Invention

In contrast, the Low-E film used in the heat-ray shielding glass of Patent Document 1 is formed by vacuum film forming method such as sputtering method, which requires a large-scaled equipment to bring about an increased production cost. Further, a metal layer such as the Low-E film is apt to be eroded and therefore a heat-ray shielding glass having the metal layer is reduced in good appearance by its long-term use. The same applies to the double glass of Patent Document 2.

Further, though the heat-ray shielding glass of Patent Document 3 has excellent function shielding near infrared rays of sun light, it shows reduced function of reflecting heat-ray emitted from inside of a room (heater). Therefore, the heat-ray shielding glass may not occasionally show sufficient performance depending on use applications.

The transparent heat-shielding film of Patent Document 4 having an electrically-conductive polymer is not capable of showing sufficient heat-ray shielding property. However, the enhancement of the heat-ray shielding property does not bring about sufficient visible light transmittance. See Table 1 of Patent Document 4.

The study of the inventors reveals that the transparent heat-ray shielding film provided with a heat-ray reflection layer having an electrically-conductive polymer shows enhanced heat shielding property depending on the conditions but has the problems of high sensitivity with respect to physical damage such as abrasion or scratch in handling owing to the reduced hardness, and reduced durability under the condition of existence of moisture (under high humidity) which is also referred as to "water resistance".

The object of the present invention is to provide heat-ray shielding glass products (i.e., solar control glass products) which have excellent heat-ray shielding property, especially thermal insulation property and enhanced durability under the condition of existence of moisture (under high humidity), and which can be prepared in low cost.

Means for Solving Problem

The object can be attained by a solar control double glass which comprises a solar control glass having a glass plate and a heat-ray reflection layer comprising an electrically-conductive polymer provided thereon and another glass plate, the solar control glass and the another glass being arranged at an interval such that the heat-ray reflection layer faces the another glass and the interval forming a hollow layer, wherein the heat-ray reflection layer has a surface resistivity of not more than $10,000\Omega/\square$.

The heat-ray reflection layer comprising an electrically-conductive polymer has increased free electron density to show enhanced heat-ray reflection property giving sufficient thermal insulation property as long as the layer especially has surface resistivity of not more than $10,000\Omega/\square$. Further, it is possible to form the heat-ray reflection layer by coating method which can be conducted in low cost since the electrically-conductive polymer is an organic polymer. Furthermore, the adoption of a double glass as mentioned above makes it possible to protect the heat-ray reflection layer comprising the electrically-conductive polymer from water such as rain water, dew drop or moisture, hence bringing about a glass product having heat-ray shielding property and enhanced water resistance (i.e., durability in the presence of water or moisture (under high humidity)).

The embodiments of the solar control double glass according to the present invention are described as follows:

(1) The electrically-conductive polymer is a polythiophene derivative comprising a recurring unit represented by the following formula (I):

[Formula 1]

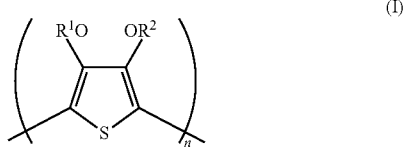

in which $R^1$ and $R^2$ independently represent a hydrogen atom or an alkyl group of 1 to 4 carbon atoms, or $R^1$ and $R^2$ combine with each other to form an alkylene group of 1 to 4 carbon atoms which may be arbitrarily substituted, and n is an integer of 50 to 1,000.

The polythiophene derivative has high electrically-conductive property and is hence suitable for the electrically-conductive polymer of the present invention.

(2) The heat-ray reflection layer has a thickness of 10 to 3,000 nm.

(3) The solar control glass is obtained by combining a plastic film having a heat-ray reflection layer provided thereon with a glass plate through an adhesive layer. Thereby the solar control glass is improved in impact resistance and penetration resistance (resistance to passing through).

(4) The adhesive layer comprises ethylene-vinyl acetate copolymer (EVA). The EVA has high transparent and excellent weather resistance, and is hence suitable for an adhesive used in the adhesive layer of the invention.

(5) The solar control glass comprises further a heat-ray shielding layer comprising a resin composition comprising a heat-ray shielding agent other than the electrically-conductive polymer and a binder. Thereby, the solar control glass acquires more excellent heat-ray shielding property, and therefore the thickness of each of the layers can be reduced and the visible-ray transmittance of the glass can be increased. Further both of the heat-ray reflection layer and heat-ray shielding layer are made of organic polymer and therefore can be formed by a low cost method such as coating method, whereby a solar control double glass having high weather resistance can be obtained.

(6) The heat-ray shielding agent mentioned above is tungsten oxide and/or composite tungsten oxide. The use of tungsten oxide and/or composite tungsten oxide as the heat-ray shielding agent contained in the heat-ray shielding layer brings about a solar control double glass having more enhanced heat-ray shielding property and high visible-ray transmittance.

(7) The tungsten oxide is represented by a general formula $W_yO_z$ wherein W represents tungsten, O represents oxygen, and y and z satisfy the condition of $2.2 \leq z/y \leq 2.999$, and the composite tungsten oxide is represented by a general formula $M_xW_yO_z$ wherein M represents at least one element selected from H, He, alkaline metals, alkaline-earth metals, rare-earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi and I, W represents tungsten, O represents oxygen, and x, y and z satisfy the conditions of $0.001 \leq x/y \leq 1$ and $2.2 \leq z/y \leq 3$.

(8) The heat-ray reflection layer has a surface resistivity of not more than $5,000 \Omega/\square$. Further improved thermal insulation property can be obtained.

(9) The heat-ray shielding has a thickness of 0.5 to 50 μm.

(10) The solar control glass has further a surface protection layer formed on the heat-ray reflection layer, the surface protection layer having a thickness of not more than 2 μm. In case the layer of the electrically-conductive polymer contains materials having excellent physical properties and water resistance, it is impossible for the layer to acquire sufficient thermal insulation property due to the reduction of free electron density. In general, in case the surface protection layer is formed on the heat-ray reflection layer, it is impossible for the layer to acquire sufficient thermal insulation property due to the absorption of infrared ray by the surface protection layer. By setting the surface protection layer formed on the heat-ray reflection layer so as to have the above-mentioned thickness, the heat-ray reflection layer comprising an electrically-conductive polymer can be protected from physical damage such as abrasion or scratch and water such as rain water, dew drop or moisture without impairing excellent thermal insulation property of the heat-ray reflection layer. Hence, the solar control glass acquires sufficiently enhanced surface hardness and improved water resistance (i.e., durability in the presence of water or moisture (under high humidity)), whereby a solar control double glass having enhanced durability can be obtained.

The thickness of the surface protection layer is preferably in the range of 0.1 to 2 μm, more preferably 0.2 to 1 μm, especially preferably 0.2 to 0.4 μm

(11) The surface protection layer is a hard coat layer formed from an ultraviolet-curable resin composition or a thermosetting resin composition.

(12) An ultraviolet ray absorbing layer is formed on the solar light receiving side of the heat-ray reflection layer. Thereby it is further possible to suppress the deterioration of the electrically-conductive polymer by ultraviolet ray.

(13) The hollow layer is formed by arranging the solar control glass and another glass plate through a spacer. Further it is preferred to place a desiccant agent within the spacer.

(14) The hollow layer is one layer selected from a dry air layer, an inert gas layer and a decompression layer. Thereby the heat-ray reflection layer comprising an electrically-conductive polymer can be sufficiently protected from water or moisture.

Another aspect of the present invention is provided by the solar control glasses described as the preferred embodiments as mentioned above. In more detail, a solar control double glass which comprises a glass plate, a heat-ray reflection layer comprising an electrically-conductive polymer provided thereon, and a heat-ray shielding layer comprising a resin composition comprising a heat-ray shielding agent other than the electrically-conductive polymer and a binder; and/or a solar control glass which comprises a glass plate, a heat-ray reflection layer comprising an electrically-conductive polymer provided thereon, and a surface protection layer provided on the heat-ray reflection layer, the surface protection layer having a thickness of not more than 2 μm, can attain the above-mentioned object of the invention though the glasses are a laminated glass in the form of one plate.

Effect of the Invention

The heat-ray shielding layer of the solar control (double) glass is formed from an electrically-conductive polymer to have the predetermined surface resistivity, and therefore has excellent thermal insulation property that heat-ray emitted from a heater or the like in a room is retained by the reflection. Further the electrically-conductive polymer is made of organic polymer and therefore a layer comprising the polymer can be formed by a low cost method such as coating method, which brings about an inexpensive product. Furthermore, the adoption of a double glass, in which the solar control glass and another glass are arranged at interval such that the heat-ray reflection layer faces the another glass, makes it possible to protect the heat-ray reflection layer comprising the electrically-conductive polymer from water such as rain water, dew drop or moisture, hence bringing about a glass product having enhanced water resistance.

DESCRIPTION OF PREFERRED EMBODIMENTS

Figure 1:
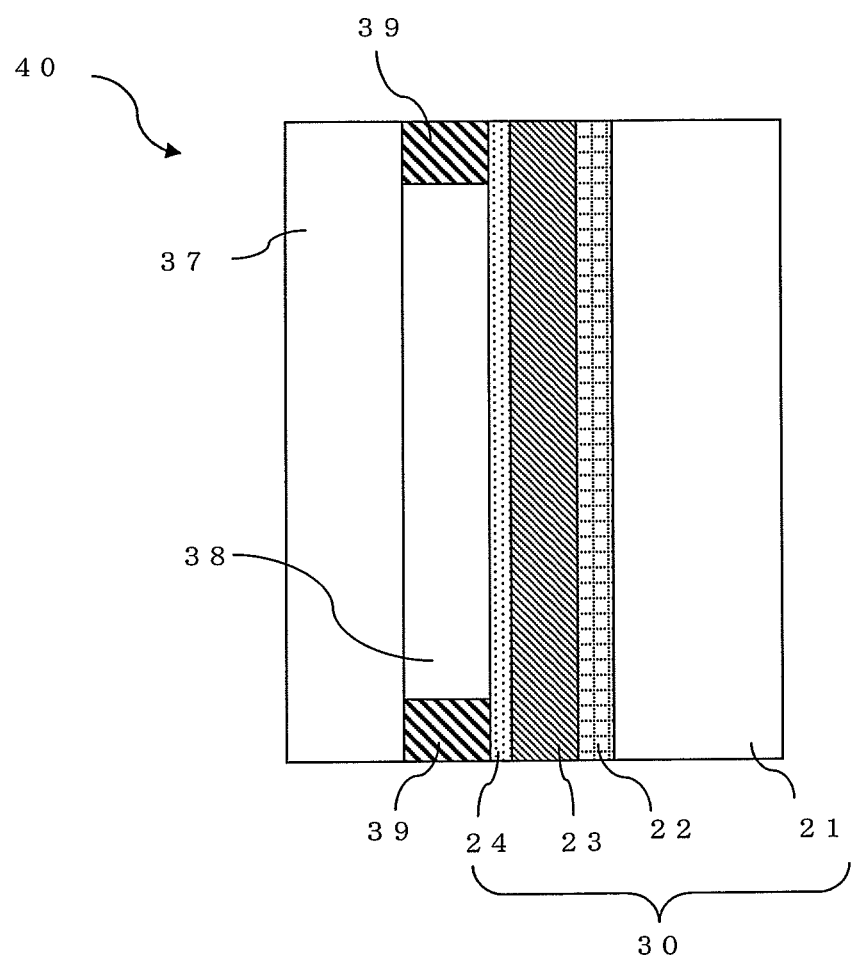
FIG. 1 is a schematic section view showing a typical example of a solar control double glass according to the present invention.

The embodiments of the present invention are explained in detail with reference of the drawings below. FIG. 1 is a schematic section view showing a typical example of embodiments of a solar control double glass according to the present invention. In the invention, the term "glass" means overall transparent substrates, and therefore the "glass" includes glass plates and transparent plastic plates as well. Thus the solar control glass means a transparent substrate having heat-ray shielding property.

The solar control double glass 40 of the invention is composed of a solar control glass 30, a glass plate 37 arranged with facing the solar control glass 30 at an interval, a spacer 39 combining them by means of adhesive (not shown in FIG. 1) provided on their outer peripheries, and a hollow layer 38 formed between the solar control glass 30 and the glass plate 37 by the spacer 39.

The solar control glass 30 of the solar control double glass 40 of the invention is explained. The solar control glass 30 shown in FIG. 1 has the structure that a glass plate 21, an adhesive layer 22 provided thereon, a transparent plastic film 23 and a heat-ray reflection layer 24 comprising an electrically-conductive polymer are superposed in this order to be united. Generally, the solar control glass 30 is prepared by forming the heat-ray reflection layer 24 comprising an electrically-conductive polymer on one side of the transparent plastic film 23 and then combining the side having no heat-ray reflection layer of the transparent plastic film 23 with the glass plate 21 through the adhesive layer 22.

Since the solar control glass 30 has the heat-ray reflection layer 24 consisting of an electrically-conductive polymer, it is possible to effectively suppress emission of heat-ray to enhance thermal insulation property. This is considered to be because the plasma-absorbing wavelength caused by free electron of the electrically-conductive polymer is present on shorter wavelength side than that of emission of a body at about surface temperature and therefore the polymer reflects electromagnetic waves which are present on higher wavelength side than the plasma-absorbing wavelength.

In the invention, the heat-ray reflection layer 24 comprising an electrically-conductive polymer has a surface resistivity of not more than $10,000\Omega/\square$. This surface resistivity brings about sufficient thermal insulation property due to sufficiently enhanced free electron density. The surface resistivity preferably is not more than $5,000\Omega/\square$, further preferably not more than $1,000\Omega/\square$, especially preferably not more than $300\Omega/\square$.

Further, the heat-ray reflection layer 24 comprising an electrically-conductive polymer has preferably a thickness of 10 to 3,000 nm, further preferably 100 to 2,000 nm, especially preferably 150 to 1,500 nm.

The heat-ray reflection layer 24 is preferably formed on the topmost surface of the solar control glass 30. Though it is not preferred to provide another layer on the heat-ray reflection layer 24, even a thin (metal) layer having conductive property or an organic resin layer having no conductive property as mentioned later may be provided on the heat-ray reflection layer 24, provided that the thickness of the thin (metal) layer or organic resin layer can be reduced in such a manner that the thin layer does not prevent the emission suppressive effect of the electrically-conductive polymer. In this case, the another layer preferably has surface resistivity of not more than $10^6\Omega/\square$, and preferably has a thickness of not more than 2 μm, further preferably not more than 1 μm.

In the invention, the adhesive layer 22 and the transparent plastic film 23 may be not provided. The heat-ray reflection layer 24 may be formed directly on the surface of the glass plate 21, or the heat-ray reflection layer 24 may be formed on the surface of the adhesive layer 22 which has been formed on the glass plate 21. The solar control glass 30 preferably has the structure that the side having no heat-ray reflection layer of the transparent plastic film 23 provided with the heat-ray reflection layer is bonded to the glass plate 21 through the adhesive layer 22 as shown in FIG. 1 because the structure is easily prepared (manufactured) and shows enhanced impact resistance and penetration resistance.

In the solar control double glass 40 of the invention, the heat-ray reflection layer 24 of the solar control glass 30 faces the glass plate 37, as shown in FIG. 1. Thereby, it is possible to protect the heat-ray reflection layer 24 comprising an electrically-conductive polymer from water such as rain water, dew drop or moisture, hence bringing about enhanced water resistance. Hence, excellent heat-ray reflection property (thermal insulation property) and visible ray transmittance of the heat-ray reflection layer 24 can be maintained for long term period.

The elements of the solar control glass 30 are explained below.

[Heat-Ray Reflection Layer]

An electrically-conductive polymer for forming the heat-ray reflection layer 24 generally is an organic polymer having conjugated double bond in its basic skeleton. Examples of the electrically-conductive polymer include polythiophene, polypyrrole, polyaniline, polyacetylene, poly(p-phenylene), polyfuran, polyfluorene, polyphenylenevinylene, derivatives thereof and copolymer from monomers constituting these polymers, and the polymer can be preferably used singly or combination of two or more kinds. Of these polymers, preferred is a polythiophene derivative having property soluble or dispersible in water or other solvents, and high conductive property and transparency. Particularly, preferred is a polythiophene derivative comprising a recurring unit represented by the following formula (I):

[Formula 2]

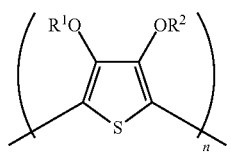

(I)

in which $R^1$ and $R^2$ independently represent a hydrogen atom or an alkyl group of 1 to 4 carbon atoms, or $R^1$ and $R^2$ combine with each other to form an alkylene group of 1 to 4 carbon atoms which may be arbitrarily substituted, and n is an integer of 50 to 1,000.

In the formula (I), examples of the alkylene group of 1 to 4 carbon atoms formed by combining $R^1$ and $R^2$ include a methylene group substituted by an alkyl group, and an ethylene-1, 2 group, propylene-1, 3 group and butene-1, 4 group arbitrarily substituted by an alkyl group of 1 to 12 carbon atoms or a phenyl group.

$R^1$ and $R^2$ in the formula (I) preferably are a methyl or ethyl group, or a methylene group, an ethylene-1, 2 group and propylene-1, 3 group as the group formed by combining $R^1$ and $R^2$. Particularly preferred is a polythiophene derivative having a recurring unit (i.e., 3,4-ethylenedioxythiophene) represented by the following formula (II):

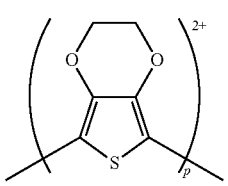

(II)

in which p is an integer of 50 to 1,000.

The electrically-conductive polymer preferably contains further a dopant (electron donor). Preferred examples of the dopant include polystyrene sulfonic acid, polyacrylic acid, polymethacrylic acid, polymaleic acid, and polyvinyl sulfonic acid. Particularly, polystyrene sulfonic acid is preferred. The use of the dopant brings about enhancement of conductive property of the electrically-conductive polymer to improve near infrared ray shielding effect of the heat-ray reflection layer 14. The dopant preferably has number average molecular weight (Mn) of 1,000 to 2,000,000, especially 2,000 to 500,000.

The content of the dopant is generally in the range of 20 to 2,000 parts by weight, preferably 40 to 200 parts by weight, based on 100 parts by weight of the electrically-conductive polymer. For example, in case the polythiophene derivative of the formula (II) is used as the electrically-conductive polymer and the polystyrene sulfonic acid used as the dopant, the content of the polystyrene sulfonic acid is generally in the range of 100 to 200 parts by weight, preferably 120 to 180 parts by weight, based on 100 parts by weight of the polythiophene derivative.

The heat-ray reflection layer 24 comprising the electrically-conductive polymer can be formed according to conventional methods. For example, a coating liquid obtained by dissolving or dispersing the electrically-conductive polymer is applied onto a surface of the transparent plastic film 23, the glass plate 21 or the adhesive layer by means of appropriate coating method such as bar coater method, roll coater method, curtain flow method, spray method, and the resultant coated layer is dried. Preferred examples of solvents used in the coating liquid include water; alcohols such as methanol, ethanol, propanol; ketones such as acetone, methyl ethyl ketone; halogenated hydrocarbons such as carbon tetrachloride, fluorohydrocarbon; esters such as ethyl acetate, butyl acetate; ethers such as tetrahydrofuran, dioxane, diethyl ether; amides such as N,N-dimethylacetamide, N,N-dimethylformamide, N-methylpyrrolidone. Especially, water and alcohols are preferred.

[Glass Plate]

The glass plate 21 of the invention may be any transparent substrates. For example, glass plates such as a green glass plate, a silicate glass plate, an inorganic glass plate and a colorless transparent glass plate, and a substrate or plate of plastic films as well can be used. Examples of the plastic include polyethylene terephthalate (PET), polyethylene naphthalate (PEN), polyethylene butyrate and polymethyl methacrylate (PMMA). A glass plate is preferred in view of weather resistance and impact resistance. The thickness of the glass plate generally is in the range of 1 to 20 mm.

[Transparent Plastic Film]

The transparent plastic film of the invention is not restricted. The materials of the transparent plastic film include any plastics having transparency (the transparency meaning transparency to visible light).

Examples of the plastic films include polyethylene terephthalate (PET) film, polyethylene naphthalate (PEN) film, polymethyl methacrylate (PMMA) film, polycarbonate (PC) film, polyethylene butyrate film. Preferred is polyethylene terephthalate (PET), because it has high resistance to processing load such as heat, solvent and bending, and especially high transparency.

Further the surface of the transparent plastic film may be subjected to adhesion treatment such as corona treatment, plasma treatment, flame treatment, primer layer coating treatment, in order to improve the adhesion of the surface. Otherwise, an adhesion layer of thermosetting resin such as copolymerized polyester resin or polyurethane resin may be provided. The thickness of the transparent plastic film generally is in the range of 1 μm to 10 mm, preferably 10 to 400 μm, especially 20 to 200 μm.

[Adhesive Layer]

Examples of materials of the adhesive layer of the invention include ethylene copolymers such as ethylene/vinyl acetate copolymer (EVA), ethylene/(meth)acrylic acid copolymer, ethylene/ethyl(meth)acrylate copolymer, ethylene/methyl(meth)acrylate copolymer, metal-ion crosslinked ethylene/(meth)acrylic acid copolymer, partially saponified ethylene/vinyl acetate copolymer, carboxylated ethylene/vinyl acetate copolymer, ethylene/(meth)acrylic acid/maleic anhydride copolymer and ethylene/vinyl acetate/(meth)acrylate copolymer. The (meth)acrylic acid means acrylic acid and methacrylic acid and the (meth)acrylate means acrylate and methacrylate. Besides these polymers, there can be mentioned polyvinyl butyral (PVB) resin, epoxy resin, phenol resin, silicon resin, polyester resin, urethane resin, rubber adhesives, thermoplastic elastomer (TPE) such as SEBS (styrene/ethylene/butylene/styrene) and SBS (styrene/butadiene/styrene). The EVA is preferred because it shows excellent adhesion, durability for long term and transparency.

The content of vinyl acetate recurring unit of EVA used in the adhesive layer preferably is in the range of 23 to 38 parts by weight, especially 23 to 28 parts by weight based on 100 parts by weight of EVA. Thereby, the adhesive layer shows excellent adhesion and transparency. EVA preferably has Melt Flow Index (MFR) of 4.0 to 30.0 g/10 min., especially 8.0 to 18.0 g/10 min, which renders preliminary pressure bonding easy.

In case the adhesive layer uses ethylene copolymer, the ethylene copolymer preferably contains further an organic peroxide. The EVA is crosslinked or cured by the organic peroxide to combine the glass plate with the adjacent layer(s), these plate and layer(s) being united. Any organic peroxides that can be decomposed at a temperature of not less than 100° C. to generate radical(s) can be employed as the organic peroxide of the invention. The organic peroxide is selected in the consideration of film-forming temperature, condition for preparing the composition, curing (bonding) temperature, heat resistance of body to be bonded, storage stability. Especially, preferred are those having a decomposition temperature of not less than 70° C. in a half-life of 10 hours.

Preferred examples of the organic peroxides include 2,5-dimethylhexane-2,5-dihydroperoxide, 2,5-dimethyl-2,5-(t-butylperoxy)hexane, di-t-butylperoxide, t-butylcumyl peroxide, 2,5-dimethyl-2,5-di(t-butylperoxy)hexane, dicumyl peroxide, α,α'-bis(t-butylperoxyisopropyl)benzene, n-butyl-4,4-bis(t-butylperoxy)valerate, 1,1-bis(t-butylperoxy)cyclohexane, 1,1-bis(t-butylperoxy)-3,3,5-trimethylcyclohexane, t-butylperoxybenzoate, benzoyl peroxide, t-butylperoxyacetate, methyl ethyl ketone peroxide, 2,5-dimethylhexyl-2,5-bisperoxybenzoate, butyl hydroperoxide, p-menthane hydroperoxide, p-chlorobenzoyl peroxide, hydroxyheptyl peroxide, chlorohexanone peroxide, octanoyl peroxide, decanoyl peroxide, lauroyl peroxide, cumyl peroxyoctoate, succinic acid peroxide, acetyl peroxide, m-toluoyl peroxide, t-butylperoxyisobutylate and 2,4-dichlorobenzoyl peroxide.

The adhesive layer preferably contains further a crosslinking auxiliary or a silane coupling agent for enhancing the adhesive strength.

Examples of crosslinking auxiliaries include esters of plural acrylic acids or methacrylic acids with polyhydric alcohol such as glycerol, trimethylol propane or pentaerythritol; and further triallyl cyanurate and triallyl isocyanurate.

Examples of the silane coupling agents include γ-chloropropylmethoxysilane, vinyltriethoxysilane, vinyltris(β-methoxyethoxy)silane, γ-methacryloxypropyltrimethoxysilane, vinyltriacetoxysilane, γ-glycidoxypropyltrimethoxysilane, γ-glycidoxypropyltriethoxysilane, β-(3,4-epoxycyclohexyl)ethyltrimethoxysilane, vinyltrichlorosilane, γ-mercaptopropyltrimethoxysilane, γ-aminopropyltriethoxysilane, N-β-(aminoethyl)-γ-aminopropyltrimethoxysilane. The silane coupling agents can be used singly, or in combination of two or more kinds. The content of the silane coupling agent is preferably in an amount of not more than 5 parts by weight based on 100 parts by weight of ethylene copolymer.

The adhesive layer including EVA preferably contains acryloxy group-containing compounds, methacryloxy group-containing compounds, epoxy group-containing compounds, plasticizers, ultraviolet absorbers for improvement or adjustment of various properties of the layer (e.g., mechanical strength, adhesive property (adhesion), optical characteristics such as transparency, heat resistance, light-resistance, cross-linking rate), particularly for improvement mechanical strength. Examples of the ultraviolet absorbers include benzophenone compounds, triazine compounds, benzoate compounds, and hindered amine compounds. The benzophenone compounds are preferred from the viewpoint of suppression of yellowing. The content of the ultraviolet absorbers is preferably in an amount of 0.01 to 1.5 parts by weight, especially 0.5 to 1.0 parts by weight based on 100 parts by weight of ethylene copolymer.

The thickness of the adhesive layer preferably is in the range of 100 to 2,000 μm, especially 400 to 1,000 μm.

The adhesive layer including ethylene copolymer can be prepared, for example, by molding a composition including ethylene copolymer and an organic peroxide, etc., by a conventional molding process such as extrusion molding or calendaring molding (calendaring) to form a product in the form of layer. The mixing of the composition is preferably carried out by kneading the composition under heating at 40 to 90° C., especially 60 to 80° C. Further, the formation of a film (layer) is preferably carried out at such temperature that the organic peroxide does not have reaction or scarcely has reaction. For example, the temperature is preferably set to the range of 40 to 90° C., especially 50 to 80° C. The adhesive layer may be formed directly on a surface of a plastic film or a glass plate. Otherwise a sheet of the adhesive layer (i.e., in the form of film) may be used for the formation of the adhesive layer.

The solar control glass 30 of the invention is prepared, for example, by providing the transparent plastic film 23 having the heat-ray reflection layer 24 and the glass plate 21, superposing the transparent plastic film 23 having the heat-ray reflection layer 24 on the glass plate 21 through the adhesive layer 22 to form a laminate, which is degassed, the adhesive layer 22 being formed on the side opposite to the heat-ray reflection layer 24 of the transparent plastic film 23 or provided on the glass plate 21, and pressing the laminate under heating (preferably 40 to 200° C. for 1 to 120 minutes, especially 60 to 150° C. for 1 to 20 minutes), the pressure being preferably $1.0 \times 10^3$ to $5.0 \times 10^7$ Pa.

These steps can be carried out, for example, by using vacuum package system or nip rollers system. For example, in case EVA is used as the adhesive layer 22, EVA is generally crosslinked at 100 to 150° C. (especially approx. 130° C.) for 10 minutes to 1 hour. This crosslinking is carried out by degassing the laminate, preliminarily bonding it under pressure, for example, at a temperature of 80 to 120° C.) and heating it at 100 to 150° C. (especially approx. 130° C.) for 10 minutes to 1 hour. Cooling after the crosslinking is generally carried out at room temperature. The cooling is preferably fast.

Even if the transparent plastic film 23 is not used, the adhesive layer 22 can be provided on the glass plate in order to improve the adhesion between the heat-ray reflection layer 24 and the glass plate 21.

Examples of the hollow layer of the solar control double glass include a dry air layer, an inert gas layer and a decompression layer. The use of the hollow layer enhances thermal insulation property and simultaneously protects the heat-ray reflection layer 24 from water such as rain water or moisture. The dry air layer may use dried air obtained by using a spacer containing a desiccant agent. The inert gas layer generally contains inert gas such as krypton gas, argon gas or xenon gas. The decompression layer preferably has atmosphere pressure of not more than 1.0 Pa, especially 0.01 to 1.0 Pa. The thickness of the hollow layer is preferably in the range of 6 to 12 mm. The hollow layer preferably is the dry air layer, the inert gas layer and the decompression layer, whereby the heat-ray reflection layer 24 can be fairly protected from water to enhance water resistance of the solar control double glass 40.

The glass plate 37 of the solar control double glass 40 may use the transparent substrate as mentioned in the glass plate 21. Further, various glasses such as a float glass, a figured glass, a glass having light diffusion function by surface treatment, a wired glass, a lined sheet glass, a reinforced glass, a double reinforced glass, a low reflectance glass, a high transparent sheet glass, a ceramic printed glass, and a special glass having heat ray or ultraviolet ray absorbing function can be appropriately selected for use in the glass plate 37. Further, a soda silicate glass, a soda lime glass, a borosilicate glass, an aluminosilicate glass and various crystallized glasses can be used in view of the composition of the glass plate.

The solar control double glass 40 may comprises various function layers such as a heat-ray shielding layer, a surface protection layer, a neon emission absorbing layer and an ultraviolet ray absorbing layer, in addition to the heat-ray reflection layer 24, as mentioned later.

The heat-ray shielding layer is a layer containing a heat-ray shielding agent other than the electrically conductive polymer. The heat-ray shielding agent generally is inorganic materials or organic dyes. The examples include tungsten oxide and/or composite tungsten oxide, indium-tin oxide, tin oxide, antimony-tin oxide, phthalocyanine dyes, metal complexes dyes, nickel dithioren complexes dyes, cyanine dyes, squalirium dyes, polymethine dyes, azomethine dyes, azo dyes, polyazo dyes, diimmonium dyes, aminium dyes, anthraquinone dyes. These materials can be employed singly or in combination.

The neon emission absorbing layer (neon cut layer) is a layer containing neon-emission selective absorption dyes. Examples of the neon-emission selective absorption dyes include polyphiline dyes, azapolyphiline dyes, cyanine dyes, squalirium dyes, anthraquinone dyes, phthalocyanine dyes, polymethine dyes, polyazo dyes, azulenium dyes, diphenylmethane dyes, triphenylmethane dyes. The neon-emission selective absorption dyes are required to have neon-emission selective absorption function at wavelength of approx. 585 nm and small absorption in a wavelength range of visible light except the wavelength. Hence, the dyes preferably have absorption maximum wavelength of 560 to 610 nm, and half bandwidth of absorption spectrum of 40 nm or less.

The ultraviolet ray absorbing layer is a layer containing an ultraviolet absorber. Examples of the ultraviolet absorber include benzophenone compounds, benzotriazole compounds, triazine compounds, benzoate compounds, hindered amine compounds, salicylic acid compounds, cyanoacrylate compounds.

These layers may be provided as separated layers depending upon properties (solubility, reactivity, etc.) of the compounds, and otherwise the mixture of the various compounds may be formed as one layer. Dyes for coloring and antioxidants may be added into theses layers so long as they do not have a large influence on the layers.

These layers may be provided on the solar control glass 30 side of the solar control double glass 40, for example, on the lower or upper layer (preferably lower layer) of the heat-ray reflection layer 24, or may be provided on the glass plate 37 side.

Particularly, in order to prevent the electrically conductive polymer from deterioration by ultraviolet rays, the ultraviolet ray absorbing layer is preferably formed on the solar light receiving side (outdoor side) to the heat-ray reflection layer 24. In more detail, in case the solar control glass 30 is arranged on the outdoor side, the ultraviolet ray absorbing layer is preferably formed on the lower side of the heat-ray reflection layer 24 of the solar control glass 30, or formed on the side opposite to the heat-ray reflection layer 24 side of the glass plate 21. Further, in case the glass plate 37 is arranged on the outdoor side, the ultraviolet ray absorbing layer is preferably formed on the upper side of the heat-ray reflection layer 24, or formed on a surface of the glass plate 37.

Figure 2:
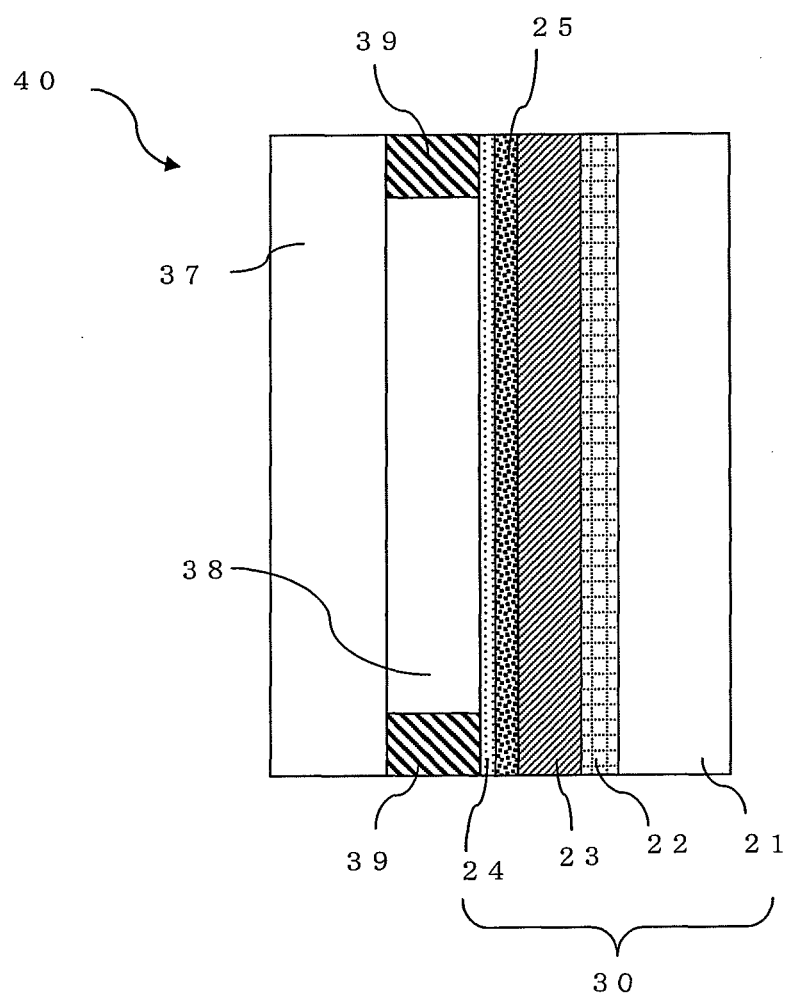
FIG. 2 is a schematic section view showing an example of preferred embodiments of a solar control double glass of the present invention.

FIG. 2 is a schematic section view showing an example of preferred embodiments of a solar control double glass of the present invention. The solar control double glass 40 of FIG. 2 has the same structure as in FIG. 1 except for changing the solar control glass 30 to a solar control glass 30 shown in FIG. 5.

Figure 5:
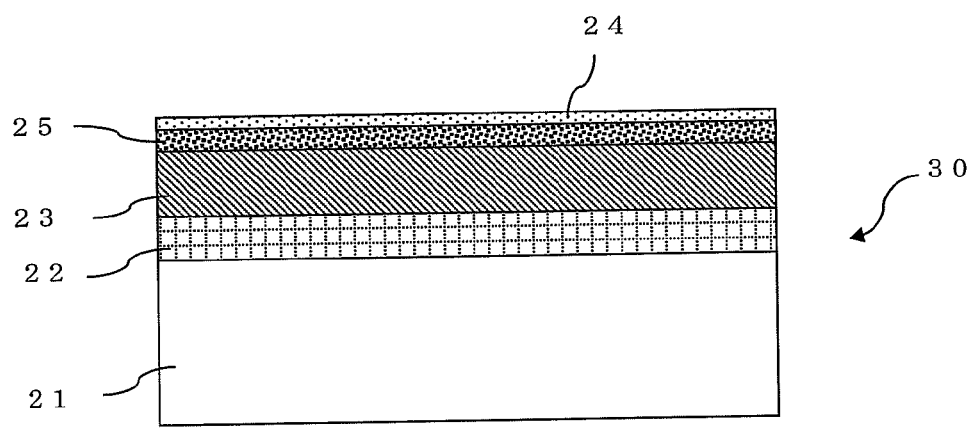
FIG. 5 is a schematic section view showing an example of preferred embodiments of a solar control glass of the present invention.

The solar control glass 30 shown in FIG. 5 is a novel solar control glass per se. In more detail, a glass plate 21, an adhesive layer 22 thereon, a transparent plastic film 23, a heat-ray shielding layer 25 consisting of a resin composition encompassing tungsten oxide and/or composite tungsten oxide as a heat-ray shielding agent and a binder, and a heat-ray reflection layer 24 consisting of an electrically conductive polymer are superposed in this order to be united. Generally, the solar control glass 30 is prepared by forming the heat-ray shielding layer 25 encompassing binder and a fine particle of heat-ray shielding agent dispersed therein on one side of the transparent plastic film 23, and forming the heat-ray reflection layer 24 consisting of an electrically conductive polymer on the heat-ray shielding layer 25, and thereafter bonding the transparent plastic film 23 to the glass plate 21 through the adhesive layer 22 such that the side opposite to the heat-ray shielding layer 25 of the transparent plastic film 23 faces the glass plate 21.

First, the solar control glass 30 of FIG. 5 has the heat-ray reflection layer 24 consisting of an electrically conductive polymer and therefore effectively suppresses emission to show enhanced thermal insulation properties. This is considered to be because the plasma-absorbing wavelength caused by free electron of the electrically-conductive polymer is present on shorter wavelength side than that of emission of a body at about surface temperature, and therefore the polymer reflects electromagnetic waves which are present on higher wavelength side than the plasma-absorbing wavelength. It is not preferred that another layer is provided on the heat-ray reflection layer 24. However, even a thin (metal) layer having conductive property or an organic resin layer having no conductive property as mentioned later may be provided on the heat-ray reflection layer 24, provided that the thickness of the thin (metal) layer or organic resin layer can be reduced in such a manner that the thin layer does not prevent the emission suppressive effect of the electrically-conductive polymer.

Secondly, the heat-ray shielding layer 25 containing a heat-ray shielding agent is provided on the lower side of the heat-ray reflection layer 24, which brings about more excellent heat-ray shielding property. The heat-ray shielding agent is generally inorganic materials or organic dyes, which can be used without particular restriction in the invention. Particularly, a (composite) tungsten oxide fine particle shows excellent function cutting near infrared rays without screening visible light, the near infrared rays being those having wavelength of approx. 850 to 1150 nm which are emitted in large quantity from the sun, whereby excellent heat-ray shielding property can be obtained. The provision of the heat-ray shielding layer 25 makes it possible to give excellent heat-ray shielding property to bring about further reduction of the thickness of the heat-ray reflection layer 24 without the reduction of visible light transmission. Hence, a solar control glass having further enhanced visible light transmission can be obtained. Further, the solar control glass 30 of FIG. 5 has a function of effectively shielding a further wide wavelength range of near infrared rays. This is considered to be because that the shielded wavelength range of near infrared ray is different between the heat-ray reflection layer 24 consisting of an electrically conductive polymer and the heat-ray shielding layer 25 containing the heat-ray shielding agent such as (composite) tungsten oxide.

The heat-ray reflection layer 24 consisting of an electrically-conductive polymer in the solar control glass 30 of FIG. 5 has preferably a surface resistivity of not more than 5,000Ω/□, further preferably not more than 1,000Ω/□, especially preferably not more than 300Ω/□. The thickness of the heat-ray reflection layer 24 consisting of an electrically-conductive polymer is preferably in the range of 10 to 3,000 nm, further preferably 100 to 2,000 nm, especially preferably 150 to 1500 nm. The thickness of the heat-ray shielding layer 25 containing a heat-ray shielding agent and a binder is preferably in the range of 0.5 to 50 μm, further preferably 1 to 10 μm, especially preferably 2 to 5 μm.

In the solar control glass 30 of FIG. 5, the adhesive layer 22 and the transparent plastic film 23 may be not provided. The heat-ray shielding layer 25 may be directly formed on the glass plate 21, and the heat-ray reflection layer 24 may be formed on the heat-ray shielding layer 25. Otherwise, the adhesive layer 22 may be directly formed on the glass plate 21, and the heat-ray shielding layer 25 and the heat-ray reflection layer 24 may be formed on the adhesive layer in this order. Otherwise, the adhesive layer 22 containing a heat-ray shielding agent may be formed as the heat-ray shielding layer 25, onto which the transparent plastic film 23 having the heat-ray shielding layer 25 may be bonded.

In the invention, the solar control glass 30 of FIG. 5 may not used as double glass but may be used as a plate laminated glass.

In the solar control glass 30 of FIG. 5, materials other than those of the heat-ray shielding layer 25 which is mentioned below are described above.

[Heat-Ray Shielding Layer]

The heat-ray shielding layer 25 consists of a resin composition encompassing a heat-ray shielding agent and a binder, as mentioned above. As the heat-ray shielding agent, any materials other than the electrically conductive polymer can be used. Generally, the heat-ray shielding agent is inorganic materials or organic dyes having absorption maximum in wavelength of 800 to 1200 nm. The examples include tungsten oxide and/or composite tungsten oxide, indium-tin oxide, tin oxide, antimony tin oxide, phthalocyanine dyes, metal complexes dyes, nickel dithioren complexes dyes, cyanine dyes, squalirium dyes, polymethine dyes, azomethine dyes, azo dyes, polyazo dyes, diimmonium dyes, aminium dyes, anthraquinone dyes. These dyes can be employed singly or in combination.

Particularly, the tungsten oxide and/or composite tungsten oxide are preferred because have excellent weather resistance and high visual light transmission.

In case the tungsten oxide and/or composite tungsten oxide are used as a heat-ray shielding agent, a fine particle of the tungsten oxide and/or composite tungsten oxide is dispersed in a binder resin composition and the dispersed fine particle is used. Though the content of the fine particle of the tungsten oxide and/or composite tungsten oxide in the heat-ray shielding layer is not restricted, the content is generally in the range of 0.1 to 50 g per 1 $m^2$, preferably 0.1 to 20 g per 1 $m^2$, more preferably 0.1 to 10 g per 1 $m^2$. Containing the composite tungsten oxide particle in the amount as mentioned above brings about a solar control glass combining excellent heat-ray shielding property with high visible light transmission.

The tungsten oxide is generally represented by a general formula $W_yO_z$ wherein W represents tungsten, O represents oxygen, and y and z satisfy the condition of $2.2 \leq z/y \leq 2.999$. Further, the composite tungsten oxide has a composition obtained by adding to the tungsten oxide element M (M represents at least one element selected from H, He, alkaline metals, alkaline-earth metals, rare-earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi and I). Hence, free electrons are generated in $W_yO_z$ even in case of z/y=3, and absorption properties derived from the free electrons develop in the region of near infrared rays, whereby the $W_yO_z$ is useful as material absorbing near-infrared rays at approx 1,000 nm (also referred to as heat-ray shielding material). In the invention, preferred is composite tungsten oxide.

In the tungsten oxide fine particle of the general formula $W_yO_z$ wherein W represents tungsten and O represents oxygen, the ratio of oxygen to tungsten is preferably less than 3, and further, y and z satisfy the condition of $2.2 \leq z/y \leq 2.999$. When z/y is not less than 2.2, occurrence of unnecessary $WO_2$ crystalline phase in near-infrared absorption material can be prevented and the chemical stability of the material can be obtained, whereby the tungsten oxide can be used in effective near-infrared absorption material. In contrast, when z/y is not more than 2.999, free electrons can be generated in the required amount whereby the resultant near-infrared absorbing material has high efficiency.

The composite tungsten oxide fine particle is preferably represented by a general formula $M_xW_yO_z$ wherein M represents at least one element selected from H, He, alkaline metals, alkaline-earth metals, rare-earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi and I, W represents tungsten, O represents oxygen, and x, y and z satisfy the conditions of $0.001 \leq x/y \leq 1$ and $2.2 \leq z/y \leq 3$, in view of stability. The alkaline metals are elements in 1st group of Periodical Table of the Elements except for hydrogen, the alkaline-earth metals are elements in 2nd group of Periodical Table of the Elements, and the rare-earth elements are Sc, Y and lanthanide elements.

Particularly, from the viewpoint of enhancement of optical properties and weather resistance, M element is preferably one or more element selected from Cs, Rb, K, Tl, In, Ba, Li, Ca, Sr, Fe and Sn. Further the composite tungsten oxide is preferably treated with a silane coupling agent, whereby the resultant oxide shows excellent dispersing properties and hence brings about excellent near-infrared shielding properties and transparency.

When x/y which represents the addition amount of M is not less than 0.001, free electrons can be generated in a sufficient amount whereby the resultant near-infrared absorbing material shows sufficient heat shielding effect. The amount of free electrons is increased with increase of the addition amount of the element M, which results in enhancement of heat shielding effect, but the amount of free electrons is saturated when x/y attains approx. 1. In contrast, when x/y is not more than 1, occurrence of an impurities phase in the solar control layer can be preferably prevented.

Also in the composite tungsten oxide represented by a general formula $M_xW_yO_z$, a value of z/y which represents control of oxygen amount functions in the same manner as in the solar control material represented by $W_yO_z$. In addition, the free electrons are provided depending on the addition amount of the element M even in case of z/y=3.0, and therefore z/y is preferably $2.2 \leq z/y \leq 3.0$, more preferably $2.45 \leq z/y \leq 3.0$.

In case the composite tungsten oxide particle has crystal structure of hexagonal crystal, the oxide is enhanced in transmission in visual light region and in absorption in near-infrared region.

In case a cation of element M exists in voids of hexagonal shape of the hexagonal crystal by the addition of the element M, the transmission in visual light region and the absorption in near-infrared region are enhanced. In general, the addition of element M having large ion radius brings about the formation of the hexagonal crystal, particularly the addition of Cs, K, Rb, Tl, In, Ba, Sn, Li, Ca, Sr, Fe facilitates the formation of the hexagonal crystal. Naturally, it is effective that even an addition element other than the above-mentioned elements exists in voids of the hexagonal shape formed from $WO_6$ units, and hence the addition element is not restricted to the above-mentioned elements.

In case the composite tungsten oxide particle having hexagonal crystal has uniform crystal structure, the addition amount of the addition element M is preferably set as a value of x/y to 0.2 to 0.5, more preferably 0.33. It is considered that x/y of 0.33 results in the addition element M being placed in all voids of the hexagonal shape.

Tungsten bronze having tetragonal or cubical crystal besides hexagonal crystal also has solar control effect. The absorption position in near-infrared region is apt to vary depending upon the crystal structures, and the absorption position tends to move in the longer wavelength direction in the order of tetragonal<cubical<hexagonal crystal. With this tendency, the absorption in visual light region is apt to become small in the order of hexagonal<cubical<tetragonal crystal. Therefore, in use (application) that is required to transmit highly visual light and to shield highly near-infrared ray, it is preferred to use tungsten bronze having hexagonal crystal. In addition, the surface of the tungsten oxide and/or composite tungsten oxide of the invention is preferably coated with oxide containing one or more kind of Si, Ti, Zr and Al for the purpose of enhancement of weather resistance.

The average particle size of the composite tungsten oxide fine particle is preferably in the range of 10 to 800 nm, especially 10 to 400 nm in order to retain the transparency. This is because particles having the average particle size of not more than 800 nm do not completely screen light due to scattering and therefore make it possible to retain visibility in the visible light region and simultaneously effectively transparency. In case of particularly emphasizing transparency the visible light region, it is preferred to consider the scattering of the particles. In case of considering the reduction of the scattering, the average particle size is preferably in the range of 20 to 200 nm, more preferably 20 to 100 nm.

The average particle size of the particle is carried out by observing a section view of the heat-ray shielding layer at 1,000,000-fold magnification by a transmission electron microscope and measuring diameters of circles corresponding to projected areas of at least 100 particles to determine their average value.

The tungsten oxide and/or composite tungsten oxide fine particle of the invention is, for example, prepared as follows:

The fine particle of the tungsten oxide represented by a general formula $W_yO_z$ and/or the fine particle of the composite tungsten oxide represented by a general formula $M_xW_yO_z$ can be obtained by subjecting a starting material of a tungsten compound to heat treatment under an inert gas or reducing gas atmosphere.

Examples of the starting material of tungsten compound preferably include tungsten trioxide powder, tungsten oxide hydrate, tungsten hexachloride powder, ammonium tungstate powder, tungsten oxide hydrate powder obtained by dissolving tungsten hexachloride in alcohol and drying it, tungsten oxide hydrate powder obtained by dissolving tungsten hexachloride in alcohol, forming precipitation by addition of water and drying the precipitation, tungsten compound powder obtained by drying an ammonium tungstate aqueous solution, and metal tungsten powder, and one or more of the examples can be also used.

In order to facilitate the preparation of the tungsten oxide fine particle, it is more preferred to use tungsten oxide hydrate powder or tungsten compound powder obtained by drying an ammonium tungstate aqueous solution. The preparation of composite tungsten fine oxide is more preferably carried out by using an ammonium tungstate aqueous solution or a tungsten hexachloride solution because the solution of starting material easily enables homogeneous mixing of elements to be used. Thus, the fine particle of the tungsten oxide and/or the composite tungsten oxide having the particle size as mentioned above can be obtained by subjecting the above-mentioned material(s) to heat treatment under an inert gas or reducing gas atmosphere.

The fine particle of the composite tungsten oxide represented by a general formula $M_xW_yO_z$ can be prepared by using a starting material of tungsten oxide particle containing an element of M or a M-containing compound though in the same manner as the starting material of tungsten oxide of a general formula $W_yO_z$. In order to prepare a starting material in which used components are homogeneously mixed in molecular level, solutions of components are preferably mixed with each other. Hence it is preferred that a tungsten compound containing element M is dissolvable in a solvent such as water, or organic solvent. For example, there are mentioned tungstate, chloride, nitrate, sulfate, oxalate or oxide containing element M. However, these are not restricted, and any in the form of solution can be preferably used.

The heat treatment under an inert gas atmosphere is preferably carried out in the condition of 650° C. or higher. The starting material heat-treated at 650° C. or higher has sufficient coloring power and hence brings about heat-ray-shielding fine particle having excellent efficiency. Examples of the inert gas include preferably Ar, $N_2$. Further, the heat treatment under a reducing gas atmosphere is preferably carried out by heating a starting material at temperature of 100 to 650° C. under a reducing gas atmosphere and heating at temperature of 650 to 1200° C. under an inert gas atmosphere. Example of the reducing gas preferably includes $H_2$, but is not restricted to. In case $H_2$ is used as the reducing gas, a composition of the reducing gas has preferably not less than 0.1% by volume of $H_2$, more preferably not less than 2% by volume of $H_2$. Use of not less than 0.1% by volume of $H_2$ enables the reduction to effectively promote.

The material powder reduced with hydrogen contains magnelli phase and shows excellent near-infrared shielding properties, and hence the material powder can be used as heat-ray shielding fine particle without modification. However, since hydrogen contained in tungsten oxide is unstable, its application may be restricted in view of weather resistance. By subjecting the tungsten oxide containing hydrogen to heat treatment at temperature of 650° C. or higher under an inert gas atmosphere, further stable heat-ray shielding particle can be obtained. Though the atmosphere in the heat treatment is not restricted, the atmosphere preferably includes $N_2$ or Ar in view of industrial aspect. The heat treatment at temperature of 650° C. or higher brings about formation of magnelli phase in the heat-ray shielding fine particle whereby weather resistance is enhanced.

The composite tungsten oxide particle of the invention has been preferably subjected to surface treatment by a coupling agent such as a silane coupling agent, a titanate coupling agent or an aluminum coupling agent. The silane coupling agent is preferred. Thereby the composite tungsten oxide becomes to have excellent compatibility with binder resin, which results in improvement of various properties such as transparency, heat-ray shielding properties.

Examples of the silane coupling agents include γ-chloropropylmethoxysilane, vinyltriethoxysilane, vinyltris(β-methoxyethoxy)silane, γ-methacryloxypropyltrimethoxysilane, vinyltriacetoxysilane, γ-glycidoxypropyltrimethoxysilane, γ-glycidoxypropyltriethoxysilane, β-(3,4-epoxycyclohexyl)ethyltrimethoxysilane, vinyltrichlorosilane, γ-mercaptopropylmethoxysilane, γ-aminopropyltriethoxysilane, N-β-(aminoethyl)-γ-aminopropyltrimethoxysilane, trimethoxyacrylsilane. Preferred are vinyltris(β-methoxyethoxy)silane, γ-methacryloxypropyltrimethoxysilane, vinyltriacetoxysilane, trimethoxyacrylsilane. The silane coupling agents can be used singly, or in combination of two or more kinds. The content of the silane coupling agent is preferably in an amount of 5 to 20 parts by weight based on 100 parts by weight of the fine particle.

As the binder of the resin composition, known thermoplastic resin, ultraviolet curable resin and thermosetting resin can be used. Examples of the binder include transparent synthetic resins such as silicone resin, fluoro resin, olefin resin, acrylic resin, polyester resin, epoxy resin, urethane resin, phenol resin, resorcinol resin, urea resin, melamine resin, furan resin. Preferred are silicone resin, fluoro resin, olefin resin, acrylic resin in view of weather resistance. The thermoplastic resin and ultraviolet curable resin, especially ultraviolet curable resin is preferred. The resin composition contains a thermal polymerization initiator or photopolymerization initiator depending upon curing methods. The resin composition further contains a curing agent such as a polyisocyanate compound. Further, in case the heat-ray shielding layer is used as an adhesive layer, the layer can use as a binder ethylene/vinyl acetate copolymer (EVA) and polyvinyl butyral (PVB) as used in an adhesive layer mentioned later.

In case the (composite) tungsten oxide is used as the heat-ray shielding agent, the content of the (composite) tungsten oxide of the heat-ray shielding layer is preferably in an amount of 10 to 500 parts by weight, further preferably 20 to 500 parts by weight, especially 30 to 300 parts by weight based on 100 parts by weight of the binder.

In case a dye such as phthalocyanine dyes other than the (composite) tungsten oxide is used singly, or combined with the (composite) tungsten oxide, the content of the dye is preferably in an amount of 0.1 to 20 parts by weight, further preferably 1 to 20 parts by weight, especially 1 to 10 parts by weight based on 100 parts by weight of the binder.

The heat-ray shielding layer may have a neon-emission absorption function to come to acquire function for adjusting color hue. For this purpose, the heat-ray shielding layer may contain a neon-emission selective absorption dye. Examples of the neon-emission selective absorption dyes include polyphiline dyes, azapolyphiline dyes, cyanine dyes, squalirium dyes, anthraquinone dyes, phthalocyanine dyes, polymethine dyes, polyazo dyes, azulenium dyes, diphenylmethane dyes, triphenylmethane dyes. The neon-emission selective absorption dyes are required to have neon-emission selective absorption function at wavelength of approx. 585 nm and small absorption in a wavelength range of visible light except the wavelength. Hence, the dyes preferably have absorption maximum wavelength of 560 to 610 nm, and half bandwidth of absorption spectrum of 40 nm or less.

The heat-ray shielding layer may further contain a dye for coloring, ultraviolet absorber, antioxidant. The preparation of the heat-ray shielding layer is preferably carried out by applying a resin composition including (composite) tungsten oxide and a binder, etc., onto a surface of a transparent plastic film or a glass plate and drying the applied film, and, if necessary, then curing it by heating or light irradiation using ultraviolet rays, X-ray, γ-ray or electron beam. The drying is preferably carried out by heating the resin composition applied onto the transparent plastic film to 60 to 150° C., especially 70 to 110° C. The drying time generally is in the range of 1 to 10 minutes. The light irradiation is carried out by using ultraviolet rays emitted from a lamp such as super high-pressure, high-pressure, medium-pressure and low-pressure mercury lamps, xenon-arc, or a metal halide lamp.

Figure 3:
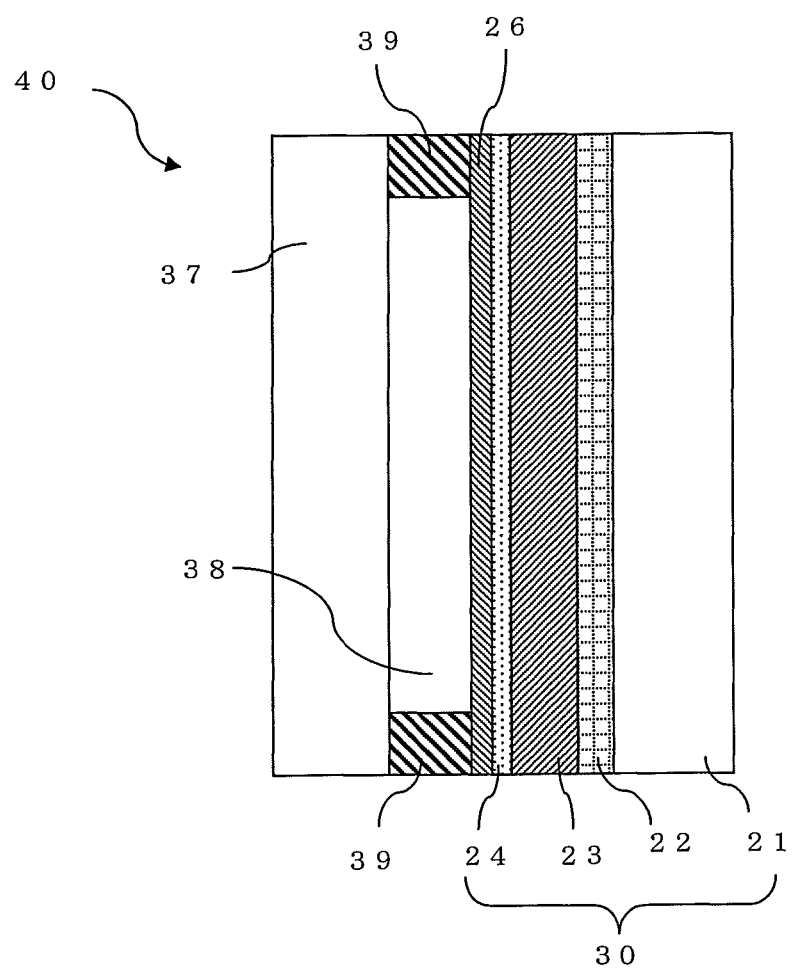
FIG. 3 is a schematic section view showing an example of preferred embodiments of a solar control double glass of the present invention.

FIG. 3 is a schematic section view showing another example of preferred embodiments of a solar control double glass of the present invention. The solar control double glass 40 of FIG. 3 has the same structure as in FIG. 1 except for changing the solar control glass 30 into a solar control glass 30 shown in FIG. 6.

Figure 6:
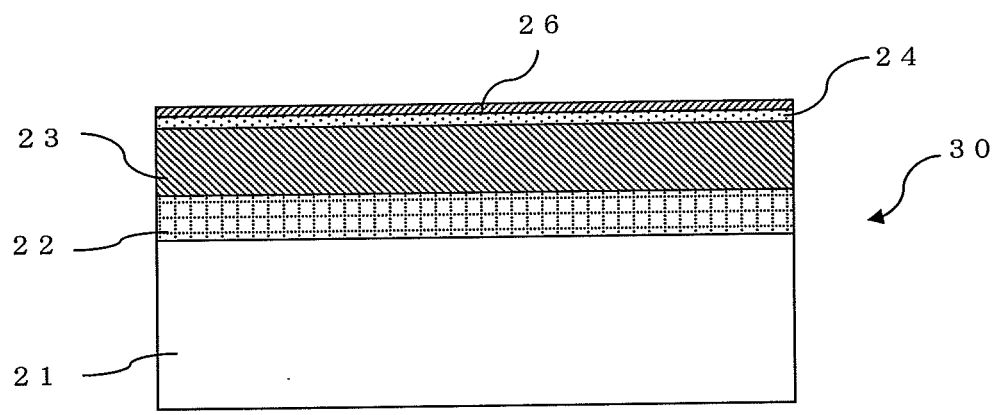
FIG. 6 is a schematic section view showing an example of preferred embodiments of a solar control glass of the present invention.

The solar control glass 30 of FIG. 6 is a novel solar control glass per se. In more detail, a glass plate 21, an adhesive layer 22 thereon, a transparent plastic film 23, a heat-ray reflection layer 24 consisting of an electrically conductive polymer and a surface protection layer 26 consisting of an ultraviolet curable resin are superposed in this order to be united. The surface protection layer 26 has a thickness of not more than 2 μm. Generally, the solar control glass 30 is prepared by forming the heat-ray reflection layer 24 consisting of an electrically conductive polymer on one side of the transparent plastic film 23, and forming the surface protection layer 26 consisting of an ultraviolet curable resin on the heat-ray reflection layer 24, and thereafter bonding the transparent plastic film 23 to the glass plate 21 through the adhesive layer 22 such that the side opposite to the heat-ray reflection layer 24 of the transparent plastic film 23 faces the glass plate 21. The solar control glass 30 of FIG. 6 effectively shields near infrared ray to show excellent thermal insulation property because it has the heat-ray reflection layer 24 consisting of an electrically conductive polymer. This is considered to be because plasma-absorbing wavelength of free electron of the electrically-conductive polymer is present on shorter wavelength side than that of emission of a body at about surface temperature and therefore the polymer reflects electromagnetic waves which are present on higher wavelength side than the plasma-absorbing wavelength. In case the layer consisting of the electrically conductive polymer further contains material having high physical properties and excellent water resistance, the layer does not generally show sufficient thermal insulation property because of the reduction of density of the free electron. Further in case the surface protection layer is formed on the heat-ray reflection layer, sufficient thermal insulation property cannot be obtained because of absorption of infrared ray by the surface protection layer. By setting the thickness of the surface protection layer 26 to not more than 2 μm, the solar control glass 30 of FIG. 6 makes it possible to protect the heat-ray reflection layer 24 from water such as rain water, dew drop or moisture and physical damage such as abrasion or scratch without impairing the emission inhibiting effect of the electrically conductive polymer and the thermal insulation property of the heat-ray reflection layer 24. The thickness of the surface protection layer 26 preferably is in the range of 0.1 to 2 μm, more preferably 0.2 to 1 μm, especially preferably 0.2 to 0.4 μm.

In the solar control glass 30 of FIG. 6, the heat-ray reflection layer 24 consisting of an electrically conductive polymer preferably has a surface resistivity of not more than 5,000Ω/□. When the heat-ray reflection layer 24 has this surface resistivity, it acquires sufficiently high free electron density to show sufficient thermal insulation property even if provided with the surface protection layer 26. The surface resistivity is more preferably not more than 1,000Ω/□, especially not more than 100Ω/□. The thickness of the heat-ray reflection layer 24 consisting of an electrically conductive polymer preferably is 10 to 3,000 nm, more preferably 100 to 2,000 nm, especially preferably 150 to 1,500 nm.

The solar control glass 30 of FIG. 6 may not have the adhesive layer 22 and the transparent plastic film 23. The solar control glass 30 may be prepared by forming the heat-ray reflection layer 24 directly on a surface of the glass plate 21, and forming the surface protection layer 26 on the heat-ray reflection layer 24, or by forming the adhesive layer 22 directly on a surface of the glass plate 21, and forming the heat-ray reflection layer 24 and the surface protection layer 26 on the adhesive layer 22 in this order.

In the invention, the solar control glass 30 of FIG. 6 may not used as double glass but may be used as a plate laminated glass.

Figure 4:
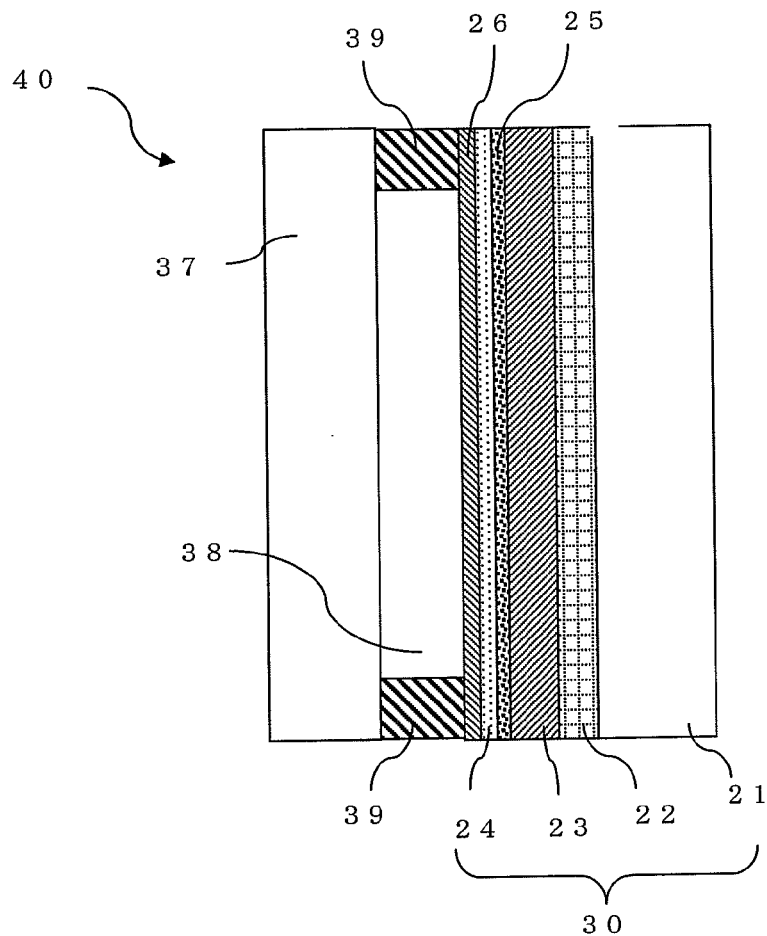
FIG. 4 is a schematic section view showing an example of preferred embodiments of a solar control double glass of the present invention.

FIG. 4 is a schematic section view showing an example of preferred embodiments of a solar control double glass of the present invention. The solar control double glass 40 of FIG. 4 has the same structure as in FIG. 1 except for changing the solar control glass 30 into a solar control glass 30 shown in FIG. 7.

Figure 7:
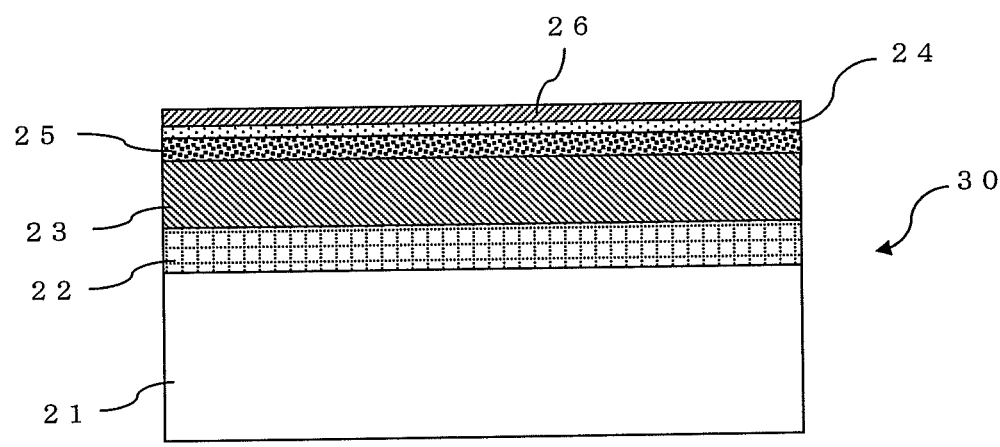
FIG. 7 is a schematic section view showing an example of preferred embodiments of a solar control glass of the present invention.

The solar control glass 30 of FIG. 7 is a novel solar control glass per se. In more detail, a glass plate 21, an adhesive layer 22 thereon, a transparent plastic film 23, a heat-ray shielding layer 25 consisting of a resin composition encompassing tungsten oxide and/or composite tungsten oxide as a heat-ray shielding agent and a binder, a heat-ray reflection layer 24 consisting of an electrically conductive polymer and a surface protection layer 26 consisting of an ultraviolet curable resin are superposed in this order to be united. The surface protection layer 26 has a thickness of not more than 2 μm. Generally, the solar control glass 30 is prepared by forming the heat-ray shielding layer 25 consisting of a resin composition dispersing a fine particle of the heat-ray shielding agent in the binder on one side of the transparent plastic film 23, further forming the heat-ray reflection layer 24 consisting of an electrically conductive polymer thereon and still forming the surface protection layer 26 consisting of an ultraviolet curable resin on the heat-ray reflection layer 24, and thereafter bonding the transparent plastic film 23 to the glass plate 21 through the adhesive layer 22 such that the side opposite to the heat-ray shielding layer 25 of the transparent plastic film 23 faces the glass plate 21.

The solar control glass 30 of FIG. 7 first effectively suppresses emission to show excellent thermal insulation property because it has the heat-ray reflection layer 24 consisting of an electrically conductive polymer. Further, by setting the thickness of the surface protection layer 26 to not more than 2 μm, the solar control glass 30 of FIG. 7 makes it possible to protect the heat-ray reflection layer 24 from water such as rain water, dew drop or moisture and physical damage such as abrasion or scratch without impairing the thermal insulation property of the heat-ray reflection layer 24. The thickness of the surface protection layer 26 preferably is in the range of 0.1 to 2 μm, more preferably 0.2 to 1 μm, especially preferably 0.2 to 0.4 μm.

Secondly, the heat-ray shielding layer 25 containing a heat-ray shielding agent is provided on the lower side of the heat-ray reflection layer 24, which brings about more excellent heat-ray shielding property. The heat-ray shielding agent is generally inorganic materials or organic dyes, which can be used without particular restriction in solar control glass 30 of FIG. 7. Particularly, (composite) tungsten oxide fine particle shows excellent function cutting near infrared rays without screening visible light, the near infrared rays being those having wavelength of approx. 850 to 1150 nm which are emitted in large quantity from the sun, whereby excellent heat-ray shielding property can be obtained. The provision of the heat-ray shielding layer 25 makes it possible to give excellent heat-ray shielding property without the reduction of visible light transmission. Further, the solar control glass 30 of FIG. 7 has a function of effectively shielding a further wide wavelength range of near infrared rays. This is considered to be because that the shielded wavelength range of near infrared ray is different between the heat-ray reflection layer 24 consisting of an electrically conductive polymer and the heat-ray shielding layer 25 containing the heat-ray shielding agent such as (composite) tungsten oxide.

In the solar control glass 30 of FIG. 7, the heat-ray reflection layer 24 consisting of an electrically conductive polymer preferably has a surface resistivity of not more than 5,000Ω/□. When the heat-ray reflection layer 24 has this surface resistivity, it acquires sufficiently high free electron density to show sufficient thermal insulation property even if provided with the surface protection layer 26. The surface resistivity is more preferably not more than 1,000Ω/□, especially not more than 100Ω/□. The thickness of the heat-ray reflection layer 24 consisting of an electrically conductive polymer preferably is 10 to 3,000 nm, more preferably 100 to 2,000 nm, especially preferably 150 to 1,500 nm. The thickness of the heat-ray shielding layer 25 containing the heat-ray shielding agent and binder preferably is 0.5 to 50 μm, more preferably 1 to 10 μm, especially preferably 2 to 5 μm.

The solar control glass 30 of FIG. 7 may not have the adhesive layer 22 and the transparent plastic film 23. The solar control glass 30 may be prepared by forming the heat-ray shielding layer 25 directly on a surface of the glass plate 21, and forming the heat-ray reflection layer 24 thereon, and then forming the surface protection layer 26 on the heat-ray reflection layer 24, or by forming the adhesive layer 22 on a surface of the glass plate 21, and forming the heat-ray shielding layer 25, the heat-ray reflection layer 24 and the surface protection layer 26 on the adhesive layer 22 in this order. Otherwise, the solar control glass 30 may be prepared by forming the adhesive layer 22 containing heat-ray shielding agent on the glass plate 21 as the heat-ray shielding layer, and forming the heat-ray reflection layer 24 thereon, and then bonding the surface protection layer 26 formed on a transparent plastic film to the heat-ray reflection layer 24.

In the invention, the solar control glass 30 of FIG. 7 may not used as double glass but may be used as a plate laminated glass.

In the solar control glasses 30 of FIGS. 6 and 7, materials other than the surface protection layer 26 are mentioned previously.

[Surface Protection Layer]

Though the explanation in FIGS. 3 and 4 describes that the surface protection layer comprise an ultraviolet curable resin, the layer may comprise any materials as long as they make it possible to protect the heat-ray reflection layer from water such as rain water, dew drop or moisture and physical damage such as abrasion or scratch. The surface protection layer generally comprises a synthetic resin. The surface protection layer preferably is a hard coat layer having hardness of HB or higher that is determined by a pencil hardness test according to JIS 5600 (1999). The hard coat layer is preferably formed from a resin composition consisting of thermosetting resin composition or ultraviolet curable resin. The thermosetting resin composition or ultraviolet curable resin composition is preferred because the composition can be cured for a short time to form the surface protection layer 26 as a hard coat layer having a predetermined hardness. The ultraviolet curable resin composition as explained in FIG. 1 is especially preferred because it can be cured for a shorter time and hence shows excellent productivity. Examples of the thermosetting resin or ultraviolet curable resin include phenol resin, resorcinol resin, urea resin, melamine resin, epoxy resin, acrylic resin, urethane resin, furan resin and silicone resin. The ultraviolet curable resin composition contains further a photopolymerization initiator in addition to ultraviolet curable resin, while the thermosetting resin composition contains further a thermal polymerization initiator in addition to thermosetting resin.

Examples of the ultraviolet curable resins (monomers, oligomers) include (meth)acrylate monomers such as 2-hydroxyethyl(meth)acrylate, 2-hydroxyropyl(meth)acrylate, 4-hydroxybutyl(meth)acrylate, 2-ethylhexylpolyethoxy (meth)acrylate, benzyl(meth)acrylate, isobornyl (meth)acrylate, phenyloxyethyl(meth)acrylate, tricyclodecane mono (meth)acrylate, dicyclopentenyloxyethyl(meth)acrylate, tetrahydrofurfuryl (meth)acrylate, acryloylmorpholine, N-vinylcaprolactam, 2-hydroxy-3-phenyloxypropyl(meth) acrylate, o-phenylphenyloxyethyl (meth)acrylate, neopentylglycol di(meth)acrylate, neopentyl glycol dipropoxy di(meth)acrylate, neopentyl glycol hydroxypivalate di(meth) acrylate, tricyclodecanedimethylol di(meth)acrylate, 1,6-hexanediol di(meth)acrylate, nonanediol di(meth)acrylate, trimethylolpropane tri(meth)acrylate, pentaerythritol tri (meth)acrylate, pentaerythritol tetra(meth)acrylate, tris [(meth)acryloxyethyl]isocyanurate and ditrimethylolpropane tetra(meth)acrylate; and the following (meth)acrylate oligomer such as:

polyurethane (meth)acrylate such as compounds obtained by reaction among the following polyol compound and the following organic polyisocyanate compound and the following hydroxyl-containing (meth)acrylate:

the polyol compound (e.g., polyol such as ethylene glycol, propylene glycol, neopentyl glycol, 1,6-hexanediol, 3-methyl-1,5-pentanediol, 1,9-nonanediol, 2-ethyl-2-butyl-1,3-propanediol, trimethylolpropane, diethylene glycol, dipropylene glycol, polypropylene glycol, 1,4-dimethylolcyclohexane, bisphenol-A polyethoxydiol and polytetramethylene glycol; polyesterpolyol obtained by reaction of the above-mentioned polyol with polybasic acid or anhydride thereof such as succinic acid, maleic acid, itaconic acid, adipic acid, hydrogenated dimer acid, phthalic acid, isophthalic acid and terephthalic acid; polycaprolactone polyol obtained by reaction of the above-mentioned polyol with ε-caprolactone; a compound obtained by reaction of the above-mentioned polyol and a reaction product of the above-mentioned polybasic acid or anhydride thereof and ε-caprolactone; polycarbonate polyol; or polymer polyol), and the organic polyisocyanate compound (e.g., tolylene diisocyanate, isophorone diisocyanate, xylylene diisocyanate, diphenylmethane-4,4'-diisocyanate, dicyclopentanyl diisocyanate, hexamethylene diisocyanate, 2,4,4'-trimethylhexamethylene diisocyanate, 2,2',4-trimethylhexamethylene diisocyanate), and the hydroxyl-containing (meth)acrylate (e.g., 2-hydroxyethyl (meth)acrylate, 2-hydroxyropyl(meth)acrylate, 4-hydroxybutyl (meth)acrylate, 2-hydroxy-3-phenyloxypropyl (meth)acrylate, cyclohexane-1,4-dimethylolmono(meth) acrylate, pentaerythritol tri(meth)acrylate or glycerol di(meth)acrylate);

bisphenol-type epoxy(meth)acrylate obtained by reaction of bisphenol-A epoxy resin or bisphenol-F epoxy resin and (meth)acrylic acid.

These compounds can be employed singly or in combination of two or more kinds. The ultraviolet curable resin can be used together with thermo polymerization initiator, i.e., these can be employed as a thermosetting resin.

To obtain the surface protection layer as a hard coat layer, hard polyfunctional monomers such as pentaerythritol tri (meth)acrylate, pentaerythritol tetra(meth)acrylate, dipentaerythritol hexa(meth)acrylate and trimethylolpropane tri (meth)acrylate, are preferably used in a main component.

Photopolymerization initiators can be optionally selected depending upon the properties of the ultraviolet curable resin used. Examples of the photopolymerization initiators include acetophenone type initiators such as 2-hydroxy-2-methyl-1-phenylpropane-1-on, 1-hydroxycyclohexylphenylketone and 2-methyl-1-[4-(methylthio)phenyl]-2-morphorino-propane-1-on; benzoin type initiators such as benzylmethylketal; benzophenone type initiators such as benzophenone, 4-phenylbenzophenone and hydroxybenzophenone; thioxanthone type initiators such as isopropylthioxanthone and 2,4-diethylhioxanthone. Further, as special type, there can be mentioned methylphenylglyoxylate. Especially preferred are 2-hydroxy-2-methyl-1-phenylpropane-1-on, 1-hydroxycyclohexylphenylketone, 2-methyl-1-[4-(methylthio)phenyl]-2-morphorinopropane-1-on and benzophenone. These photopolymerization initiators can be employed together with one or more kinds of a conventional photopolymerization promoter such as a benzoic acid type compound (e.g., 4-dimethylaminobenzoic acid) or a tertiary amine compound by mixing with the promoter in optional ratio. Only the initiator can be employed singly or in combination of two or more kinds. Especially, 1-hydroxycyclohexylphenylketone (Irgercure 184, available from Chiba-Specialty Chemicals) is preferred. The initiator is preferably contained in the resin composition in the range of 0.1 to 10% by weight, particularly 0.1 to 5% by weight based on the resin composition.

The thermal polymerization initiator of the thermosetting resin generally is a compound containing a functional group initiating polymerization by heating such as an organic peroxide or cationic polymerization initiator. Examples of the initiator include 1,1-bis(t-butylperoxy)-3,3,5-trimethylcyclohexane, 1,1-bis(t-hexylperoxy)-3,3,5-trimethylcyclohexane, 2,5-dimethyl-2,5-(t-butylperoxy)hexane, t-butylperoxy-2-ethylhexanate, t-butylperoxybenzoate, and t-butylperoxyisopropylmonocarbonate. Particularly 1,1-bis (t-butylperoxy)-3,3,5-trimethylcyclohexane, and 2,5-dimethyl-2,5-(t-butylperoxy)hexane are preferred. The thermal polymerization initiator is preferably contained in the resin composition in the range of 0.01 to 10% by weight, particularly 0.1 to 5% by weight based on the resin composition.

The surface protection layer further may contain an ultraviolet absorber, an infrared absorbing agent, an aging resistant agent, a processing auxiliary agent for paint and a coloring agent in a small amount. The content is generally used in an amount of 0.1 to 10 parts by weight, preferably 0.1 to 5 parts by weight based on 100 parts by weight of the resin composition.

The surface protection layer can be formed by mixing a resin composition (preferably including ultraviolet curable resin and photopolymerization initiator, or including thermosetting resin and thermal polymerization initiator) and if necessary, other additives to give a coating liquid, applying the coating liquid onto a surface of a heat-ray reflection layer, and drying the applied layer, and then curing the dried layer by ultraviolet irradiation or heat treatment.

The application in the use of the ultraviolet curable resin can be carried out, for example, by applying a coating liquid (solution) of ultraviolet curable resin including acrylic monomers in a solvent such as toluene by means of gravure coater, and drying, and then exposing to UV rays and curing. This wet-coating method enables high-speed, and uniform and cheap film formation. After the coating, for example, the coated layer is exposed to UV rays to be cured whereby the effects of improved adhesion and enhanced hardness of the layer can be obtained.

In the use of the ultraviolet curable resin, when the ultraviolet curable resin is cured in the presence of nitrogen, the resultant surface protection layer has higher hardness because inhibition of polymerization by oxygen in air can be eliminated. Since the surface protection layer of the invention has a thin film of not more than 2 µm, the curing in the presence of nitrogen advantageously enables the formation of the surface protection layer having high hardness.

In the UV-rays curing, it is possible to adopt, as light source used, various sources generating light in the wavelength range of from ultraviolet to visible rays. Examples of the sources include super-high-pressure, high-pressure and low-pressure mercury lamps, a chemical lamp, a xenon lamp, a halogen lamp, a mercury halogen lamp, a carbon arc lamp, and an incandescent electric lamp, and laser beam. The exposing time is generally in the range of a few seconds to a few minutes, depending upon kinds of the lamp and strength of light. To promote the curing, the laminate may be heated beforehand for 40 to 120° C., and then the heated laminate may be exposed to ultraviolet rays.

The shape of the solar control double glass or solar control glass of the invention includes various shapes such as rectangle, circle and rhombus, and the shape is selected depending upon use applications. The solar control double glass or solar control glass can be used in wide applications such as a window glass for building and vehicle (automobile, rail car, marine vessel), an electronic device such as a plasma display, and a door or wall portion of various devices such as refrigerator and thermal insulation system.

In case the solar control double glass of the invention is used for a window glass for building and vehicle in temperate regions such as relatively low-latitude region, the solar control double glass is preferably arranged such that the glass plate is placed on the indoor side while the solar control glass placed on the outdoor side. Thereby sun light and near infrared rays emitted from the outdoor can be effectively shielded.

In contrast, in case the solar control double glass of the invention is used in cold regions such as relatively high-latitude region, the solar control double glass is preferably arranged such that the glass plate is placed on the outdoor side while the solar control glass placed on the indoor side. Thereby, infrared rays emitted from a heater in the indoor is retained by reflection (thermal insulating properties) to enhance the heating efficiency. The solar control double glass of the invention is excellent in thermal insulating properties, and therefore effectively used in cold regions.

EXAMPLE

Examples are set forth below to explain the present invention in detail.

I. Comparison Between Double Glass and Single Glass (A) Preparation of Solar Control Glass (Single Glass)

Comparison Example 1

(1) Preparation of Heat-Ray Reflection Layer

An aqueous dispersion (solid content: 1.2% by weight) was applied onto a PET film (thickness: 100 µm) with a bar coater, dried at 120° C. for 3 minutes to form a heat-ray reflection layer (thickness: 150 nm). The aqueous dispersion is a mixture consisting of polythiophene derivative A and poly(styrene sulfonic acid) (1:2.5 (parts by weight)) and has trade name of Clevios FE which is available from H. C. Starck GmbH.

(2) Preparation of Adhesive Layer

A composition having the following formulation was rolled by calendaring to prepare an adhesive layer (thickness: 0.4 mm) in the form of sheet. The kneading of the composition was carried out at 80° C. for 15 minutes, and the temperature of the calendar roll was 80° C. and its processing rate was 5 m/min

| (Formulation of adhesive layer (parts: parts by weight)) | |
|---|---|
| EVA (content of vinyl acetate based on 100 parts of EVA: 25 wt. %, Ultracene 635 available from Tosoh Corporation): | 100 parts |
| Crosslinker (t-butylperoxy-2-ethylhexyl monocarbonate; Trigonox 117 available from Kayaku Akzo Corporation): | 2.5 parts |
| Crosslinking auxiliary (triallyl isocyanurate; TAIC (registered mark) available from Nippon Kasei Chemical Co., Ltd.) | 2 parts |
| Silane coupling agent (γ-methacryloxypropyltrimethoxysilane; KBM503 available from Shin-Etsu Chemical Co., Ltd.): | 0.5 part |
| UV absorber (1) (Uvinul 3049 available from BASF): | 0.15 part |

(3) Preparation of Solar Control Glass

The adhesive layer, and the PET film and heat-ray reflection layer formed thereon as prepared above were laminated on a glass plate (thickness: 3 mm) in this order. The resultant laminate was temporarily bonded under pressure by heating at 100° C. for 30 minutes, and then heated in an autoclave under pressure of 13×10$^5$ Pa at 140° C. for 30 minutes. Thereby, the glass plate and the transparent plastic film (PET film) were combined to be united to prepare a solar control glass (also referred to as a single glass or single laminated glass).

Comparison Example 2

The procedures of Comparison Example 1 were repeated except for using polythiophene derivative B (SEPLEGYDA OC-X109, available from Shin-Etsu Polymer Co., Ltd.) instead of the polythiophene derivative A to prepare a solar control glass.

Comparison Example 3

The procedures of Comparison Example 1 were repeated except for using polythiophene derivative C (SEPLEGYDA OC-AE23, available from Shin-Etsu Polymer Co., Ltd.) instead of the polythiophene derivative A to prepare a solar control glass.

(B) Preparation of Solar Control Double Glass

Example 1

A glass plate (thickness: 3 mm) and the solar control glass prepared in Comparison Example 1 were superposed with each other through a spacer made of aluminum in the form of frame which was placed on their peripheral area such that the heat-ray reflection layer of the solar control glass is present on the side of an air layer formed by the spacer, and they were bonded with butyl rubber. The air layer had a thickness of 6 mm.

Example 2

The procedures of Example 1 were repeated except for using the solar control glass prepared in Comparison Example 2 instead of one prepared in Comparison Example 1 to prepare a solar control double glass.

Example 3

The procedures of Example 1 were repeated except for using the solar control glass prepared in Comparison Example 3 instead of one prepared in Comparison Example 1 to prepare a solar control double glass.

(C) Evaluation Method

Each of the glass samples is subjected to heat and humidity treatment in an atmosphere of temperature of 85° C. and humidity of 85 RH % for 500 hours. The haze values (%) of the sample before and after the test are determined by a haze meter NDH2000 available from NIPPON DENSHOKU INDUSTRIES CO. LTD.

(D) Evaluation Result

Evaluation result of the glass samples is shown in Table 1.

TABLE 1

| | | Ex. 1 | Ex. 2 | Ex. 3 | Co. Ex. 1 | Co. Ex. 2 | Co. Ex. 3 |
|---|---|---|---|---|---|---|---|
| Haze value (%) | Before treatment | 1 | 1.3 | 1.3 | 1 | 1.3 | 1.3 |
| | After treatment | 1 | 1.3 | 1.3 | 6.0 | 3.4 | 5.9 |

As set forth in Table 1, the single glasses of Comparison Examples 1-3 are increased in haze value after treatment, which shows poor water resistance, even if any polythiophene derivatives are used. In contrast, the single glasses of Examples 1-3 have no difference in haze value between before and after treatments, which shows improved water resistance, even if any polythiophene derivatives are used.

II. Evaluation of Solar Control Double Glass (A) Preparation of Solar Control Double Glass

Example 4

(1) Preparation of Heat-Ray Reflection Layer

An aqueous dispersion (solid content: 1.2% by weight) was applied onto a PET film (thickness: 100 μm) with a bar coater, and dried at 120° C. for 3 minutes to form a heat-ray reflection layer (thickness: 150 nm). The aqueous dispersion is a mixture consisting of poly(3,4-ethylenedioxythiophene) and poly(styrene sulfonic acid) (1:2.5 (parts by weight)).

(2) Preparation of Adhesive Layer

The adhesive layer was prepared in the same manner as in (2) of Comparison Example 1.

(3) Preparation of Solar Control Glass

The solar control glass was prepared in the same manner as in (3) of Comparison Example 1.

(4) Preparation of Solar Control Double Glass

The solar control double glass was prepared in the same manner as in Example 1.

Example 5

The procedures of Example 4 were repeated except for changing the thickness of the heat-ray reflection layer to 450 nm to prepare a solar control double glass.

Comparison Example 4

A solar control double glass was prepared by using two glass plates (thickness: 3 mm) in the same manner as in Example 1.

Comparison Example 5

(1) Preparation of Heat-Ray Reflection Layer

A methanol dispersion of polyaniline (solid content: 1% by weight) was applied onto a PET film (thickness: 100 μm) with a bar coater, dried at 120° C. for 3 minutes to form a heat-ray reflection layer (thickness: 150 nm).

(2) Preparation of Adhesive Layer

The adhesive layer was prepared in the same manner as in (2) of Comparison Example 1.

(3) Preparation of Solar Control Glass

The solar control glass was prepared in the same manner as in (3) of Comparison Example 1.

(4) Preparation of Solar Control Double Glass

The solar control double glass was prepared in the same manner as in Example 1.

Comparison Example 6

(1) Preparation of Solar Control Glass

An indium-tin oxide (ITO) film, a silver film, an ITO film, a silver film and an ITO film were sputtered on a glass plate (thickness: 3 mm) in this order by using a direct current sputtering device according to in-line system to form a heat-ray reflection layer, whereby a solar control glass was prepared. The sputtering of the ITO was carried out at discharge current of 6 A with the introduction of argon and oxygen in flow volume ratio of 98:10, while the sputtering of the silver was carried out at discharge current of 0.9 A with the introduction of only argon.

(2) Preparation of Solar Control Double Glass

A solar control double glass was prepared by using a glass plate (thickness: 3 mm) and the solar control glass prepared in (1) in the same manner as in Example 1.

(B) Evaluation Method (1) Surface Resistivity

Surface resistivity of each of the resultant solar control double glasses is determined by a resistivity meter (Loresta GP, available from Mitsubishi Chemical Analytech Co., Ltd.).

(2) Heat Transmission Coefficient

The coefficient is determined according to JIS R 3107.

(3) Weather Resistance

Each of the resultant solar control double glasses is allowed to stand at an atmosphere of temperature of 85° C. and humidity of 85% RH for 1,000 hours, and then the appearance is evaluated. "∘" means no occurrence of appearance change, while "x" means occurrence of appearance change such as corrosion.

(C) Evaluation Result

Evaluation result of the glass samples is shown in Table 2.

TABLE 2

|  | Ex. 4 | Ex. 5 | Co. Ex. 4 | Co. Ex. 5 | Co. Ex. 6 |
|---|---|---|---|---|---|
| Heat-ray reflection layer | Conductive polymer | Conductive polymer | None | Conductive polymer | ITO/Ag |
| Surface resistivity (Ω/□) | 500 | 100 | $1 \times 10^{14}$ | $1 \times 10^{6}$ | 2 |
| Heat transmission coefficient (W/(m² · K)) | 3.0 | 2.8 | 3.5 | 3.5 | 2.5 |
| Weather resistance | ∘ | ∘ | ∘ | ∘ | x |

As apparent from Table 2, the solar control double glasses of Examples 4 and 5 show lowered heat transmission coefficient which means lowered heat-ray emission property (enhanced thermal insulation property) compared with one of Comparison Example 4 having no heat-ray reflection layer. Even if a solar control double glass has a heat-ray reflection layer, the use of a heat-ray reflection layer having surface resistivity of $1 \times 10^{6}\Omega/\square$ (Comparison Example 5) does not show high heat transmission coefficient not to give sufficient thermal insulation property. Further, the solar control double glass having a heat-ray reflection layer of ITO/Ag film (Comparison Example 6) does not show poor weather resistance, and therefore the solar control double glasses of Examples 4 and 5 have an advantage from this viewpoint compared with one of Comparison Example 6.

Other Examples are described below, and the preferred embodiments of the solar control glass of the invention are explained.

III. Evaluation of Constitution Having Heat-Ray Shielding Layer (A) Preparation of Solar Control Glass Example 6

(1) Preparation of Heat-Ray Shielding Layer

A composition having the following components was applied onto a PET film (thickness: 100 μm) with a bar coater, dried, and dried in an oven at 80° C. for 2 minutes. Thereby a heat-ray shielding layer having thickness of 5 μm was formed on the PET film.

| (Composition for forming heat-ray shielding layer (part(s): part(s) by weight)) | |
|---|---|
| Dipentaerythritol hexaacrylate | 80 parts |
| Irgacure 184 (available from Ciba specialty chemicals) | 5 parts |
| $Cs_{0.33}WO_3$ (mean particle size: 80 nm) | 20 parts |
| Methyl isobutyl ketone | 300 parts |

(2) Preparation of Heat-Ray Reflection Layer

An aqueous dispersion (solid content: 1.2% by weight) was applied onto the heat-ray shielding layer with a bar coater, and dried at 120° C. for 3 minutes to form a heat-ray reflection layer (thickness: 300 nm) on the PET film. The aqueous dispersion is a mixture consisting of poly(3,4-ethylenedioxythiophene) and poly(styrene sulfonic acid) (1:2.5 (parts by weight)).

(3) Preparation of Adhesive Layer

A composition having the following formulation was rolled by calendaring to prepare an adhesive layer (thickness: 0.4 mm) in the form of sheet. The kneading of the composition was carried out at 80° C. for 15 minutes, and the temperature of the calendar roll was 80° C. and its processing rate was 5 m/min.

| (Formulation of adhesive layer (parts: parts by weight)) | |
|---|---|
| EVA (content of vinyl acetate based on 100 parts of EVA: 25 wt. %, Ultracene 635 available from Tosoh Corporation): | 100 parts |
| Crosslinker (t-butylperoxy-2-ethylhexyl monocarbonate; Trigonox 117 available from Kayaku Akzo Corporation): | 2.5 parts |
| Crosslinking auxiliary (triallyl isocyanurate; TAIC (registered mark) available from Nippon Kasei Chemical Co., Ltd.) | 2 parts |
| Silane coupling agent (γ-methacryloxypropyltrimethoxysilane; KBM503 available from Shin-Etsu Chemical Co., Ltd.): | 0.5 part |
| UV absorber (1) (Uvinul 3049 available from BASF): | 0.5 part |

(4) Preparation of Solar Control Glass

The adhesive layer, and the heat-ray shielding layer and heat-ray reflection layer formed on the PET film as prepared above were laminated on a glass plate (thickness: 3 mm) in this order. The resultant laminate was temporarily bonded under pressure by heating at 100° C. for 30 minutes, and then heated in an autoclave under pressure of $13 \times 10^5$ Pa at 140° C. for 30 minutes. Thereby, the glass plate and the transparent plastic film (PET film) were combined to be united to prepare a solar control glass.

(B) Preparation of Solar Control Double Glass

Example 7

(1) Preparation of Double Glass

A glass plate (thickness: 3 mm) and the solar control glass prepared in Example 6 were superposed with each other through a spacer made of aluminum in the form of frame which was placed on their peripheral area such that the heat-ray reflection layer of the solar control glass faces an air layer formed by the a spacer, and they were bonded with butyl rubber. The air layer had a thickness of 12 mm.

Comparison Example 7

(1) Preparation of Heat-Ray Reflection Layer

The heat-ray reflection layer (thickness: 5 μm) was prepared in the same manner as in (1) of Comparison Example 6.

(2) Preparation of Adhesive Layer

The adhesive layer was prepared in the same manner as in (3) of Example 6.

(3) Preparation of Solar Control Glass

The solar control glass was prepared in the same manner as in (4) of Example 6.

Comparison Example 8

(1) Preparation of Solar Control Glass

An indium-tin oxide (ITO) film, a silver film, an ITO film, a silver film and an ITO film were sputtered on a glass plate (thickness: 3 mm) in this order by using a direct current sputtering device according to in-line system to form a heat-ray reflection layer, whereby a solar control glass was prepared. The sputtering of the ITO was carried out at discharge current of 6 A with the introduction of argon and oxygen in flow volume ratio of 98:10, while the sputtering of the silver was carried out at discharge current of 0.9 A with the introduction of only argon.

Comparison Example 9

(1) Preparation of Solar Control Double Glass

A solar control double glass was prepared by using two glass plates (thickness: 3 mm) in the same manner as in Example 6.

Comparison Example 10

(1) Preparation of Solar Control Double Glass

A solar control double glass was prepared by using a glass plate (thickness: 3 mm) and the solar control glass prepared in Comparison Example 7 in the same manner as in Example 6.

Comparison Example 11

(1) Preparation of Solar Control Double Glass

A solar control double glass was prepared by using a glass plate (thickness: 3 mm) and the solar control glass prepared in Comparison Example 8 in the same manner as in Example 6.

(B) Evaluation Method (1) Surface Resistivity

Surface resistivity of each of the resultant solar control glasses is determined by a resistivity meter (Loresta GP, available from Mitsubishi Chemical Analytech Co., Ltd.).

(2) Visible Ray Transmission

By using transmission spectra of the glasses obtained in Examples and Comparison Examples measured by a spectral photometer (UV3100PC available from Shimadzu Corporation), Y in tristimulus value of XYZ display system of each of the spectra is calculated to obtain luminous transmittance (Y). The calculation is carried out according to two degree of C light source (JIS Z8722-2000).

(3) Solar Transmission

The transmission is determined according to JIS R 3106.

(4) Heat Transmission Coefficient

The coefficient is determined according to JIS R 3107.

(5) Weather Resistance

Each of the resultant solar control glasses is allowed to stand at an atmosphere of temperature of 85° C. and humidity of 85% RH for 1,000 hours, and then the appearance is evaluated. "○" means no occurrence of appearance change, while "x" means occurrence of appearance change such as corrosion.

(C) Evaluation Result

Evaluation result of the glass samples is shown in Table 3.

TABLE 3

| | Ex. 6 | Co. Ex. 7 | Co. Ex. 8 | Ex. 7 | Co. Ex. 9 | Co. Ex. 10 | Co. Ex. 11 |
|---|---|---|---|---|---|---|---|
| Type | Single glass | Single glass | Single glass | Double glass | Double glass | Double glass | Double glass |
| Heat-ray reflection layer | Conductive polymer | None | ITO/Ag | Conductive polymer | None | None | ITO/Ag |
| Heat-ray shielding layer | Composite tungsten oxide | Composite tungsten oxide | None | Composite tungsten oxide | None | Composite tungsten oxide | None |
| Surface resistivity ($\Omega/\square$) | 100 | $1 \times 10^{14}$ | 5 | — | — | — | — |
| Visible ray transmission (%) | 65 | 75 | 70 | 60 | 80 | 68 | 63 |
| Solar transmission (%) | 35 | 40 | 45 | 32 | 75 | 36 | 40 |
| Heat transmission coefficient (W/(m² · K)) | 5.2 | 5.9 | — | 2.7 | 3.4 | 3.4 | 2.4 |
| Weather resistance | ○ | ○ | x | ○ | ○ | ○ | x |

As apparent from Table 3, the solar control glass of Example 6 show lowered heat transmission coefficient which means lowered heat-ray emission property compared with one of Comparison Example 7. Further, the solar control glass having a heat-ray reflection layer of ITO/Ag film (Comparison Example 8) does not show poor weather resistance, and therefore the solar control glass of Example 6 has an advantage from this viewpoint compared with one of Comparison Example 8. Furthermore, the solar control double glass of Example 7 show lowered heat transmission coefficient which means lowered heat-ray emission property compared with those of Comparison Examples 9 and 10. Moreover, the solar control double glass of Comparison Example 11 does not show poor weather resistance, and therefore the solar control double glass of Example 7 has an advantage from this viewpoint compared with one of Comparison Example 11.

Other Examples are described below, and the preferred embodiments of the solar control glass of the invention are explained.

IV. Evaluation of Constitution Having Surface Protection Layer (A) Preparation of Solar Control Glass Example 8

(1) Preparation of Heat-Ray Reflection Layer

An aqueous dispersion (solid content: 1.2% by weight) was applied onto a PET film (thickness: 100 µm) with a bar coater, and dried at 120° C. for 3 minutes to form a heat-ray reflection layer (thickness: 450 nm). The aqueous dispersion is a mixture consisting of poly(3,4-ethylenedioxythiophene) and poly(styrene sulfonic acid) (1:2.5 (parts by weight)).

(2) Preparation of Surface Protection Layer

A composition having the following components was applied onto the heat-ray reflection layer with a roll coater, and the applied layer was exposed to ultraviolet rays at an atmosphere of nitrogen (high-pressure mercury lamp, irradiation distance of 20 cm, irradiation time of 5 sec.). Thereby a surface protection layer having thickness of 0.2 μm was formed as a hard coat layer.

| (Composition for forming surface protection layer (part(s): part(s) by weight)) | |
|---|---|
| Dipentaerythritol hexaacrylate (DPHA) | 30 parts |
| Irgacure 184 (available from Ciba specialty chemicals) | 2 parts |
| Methyl isobutyl ketone | 100 parts |

(3) Preparation of Adhesive Layer

A composition having the following formulation was rolled by calendaring to prepare an adhesive layer (thickness: 0.4 mm) in the form of sheet. The kneading of the composition was carried out at 80° C. for 15 minutes, and the temperature of the calendar roll was 80° C. and its processing rate was 5 m/min

| (Formulation of adhesive layer (parts: parts by weight)) | |
|---|---|
| EVA (content of vinyl acetate based on 100 parts of EVA: 25 wt. %, Ultracene 635 available from Tosoh Corporation): | 100 parts |
| Crosslinker (t-butylperoxy-2-ethylhexyl monocarbonate; Trigonox 117 available from Kayaku Akzo Corporation): | 2.5 parts |
| Crosslinking auxiliary (triallyl isocyanurate; TAIC (registered mark) available from Nippon Kasei Chemical Co., Ltd.) | 2 parts |
| Silane coupling agent (γ-methacryloxypropyltrimethoxysilane; KBM503 available from Shin-Etsu Chemical Co., Ltd.): | 0.5 part |
| UV absorber (1) (Uvinul 3049 available from BASF): | 0.5 part |

(4) Preparation of Solar Control Glass

The adhesive layer, and the heat-ray reflection layer and surface protection layer formed on the PET film as prepared above were laminated on a glass plate (thickness: 3 mm) in this order. The resultant laminate was temporarily bonded under pressure by heating at 100° C. for 30 minutes, and then heated in an autoclave under pressure of 13×10$^5$ Pa at 140° C. for 30 minutes. Thereby, the glass plate and the transparent plastic film (PET film) were combined to be united to prepare a solar control glass.

Example 9

The procedures of Example 8 were repeated except for changing the thickness of the surface protection layer to 2.0 μm to prepare a solar control double glass.

Example 10

(1) Preparation of Heat-Ray Shielding Layer

A composition having the following components was applied onto a PET film (thickness: 100 μm) with a bar coater, dried, and dried in an oven at 80° C. for 2 minutes. Thereby a heat-ray shielding layer having thickness of 5 μm was formed on the PET film.

| (Composition for forming solar control layer (part(s): part(s) by weight)) | |
|---|---|
| Pentaerythritol triacrylate | 80 parts |
| Irgacure 184 (available from Ciba specialty chemicals) | 5 parts |
| $Cs_{0.33}WO_3$ (mean particle size: 80 nm) | 20 parts |
| Methyl isobutyl ketone | 300 parts |

(2) Preparation of Heat-Ray Reflection Layer

An aqueous dispersion (solid content: 1.2% by weight) was applied onto the heat-ray shielding layer with a bar coater, and dried at 120° C. for 3 minutes to form a heat-ray reflection layer (thickness: 450 nm) on the PET film. The aqueous dispersion is a mixture consisting of poly(3,4-ethylenedioxythiophene) and poly(styrene sulfonic acid) (1:2.5 (parts by weight)).

(3) Preparation of Surface Protection Layer

The surface protection layer was prepared in the same manner as in (2) of Example 8.

(4) Preparation of Adhesive Layer

The adhesive layer was prepared in the same manner as in (3) of Example 8.

(5) Preparation of Solar Control Glass

The solar control glass was prepared in the same manner as in (4) of Example 8 except the provision of the heat-ray reflection layer under the heat-ray reflection layer.

Comparison Example 12

(1) Preparation of Heat-Ray Reflection Layer

The heat-ray reflection layer (thickness: 450 nm) was prepared in the same manner as in (1) of Example 8.

(2) Preparation of Adhesive Layer

The adhesive layer was prepared in the same manner as in (3) of Example 8.

(3) Preparation of Solar Control Glass

The solar control glass was prepared except no provision of the surface protection layer in the same manner as in (4) of Example 8.

Comparison Example 13

The procedures of Example 8 were repeated except for changing the thickness of the surface protection layer to 3.0 μm to prepare a solar control glass.

Comparison Example 14

(1) Preparation of Solar Control Glass

An indium-tin oxide (ITO) film, a silver film, an ITO film, a silver film and an ITO film were sputtered on a glass plate (thickness: 3 mm) in this order by using a direct current sputtering device according to in-line system to form a heat-ray reflection layer, whereby a solar control glass was prepared. The sputtering of the ITO was carried out at discharge current of 6 A with the introduction of argon and oxygen in flow volume ratio of 98:10, while the sputtering of the silver was carried out at discharge current of 0.9 A with the introduction of only argon.

(B) Evaluation Method
(1) Emissivity
The emissivity is determined according to JIS R 3106.
(2) Solar Transmission
The coefficient is determined according to JIS R 3106.
(3) Weather Resistance
Each of the resultant solar control glasses is allowed to stand at an atmosphere of temperature of 85° C. and humidity of 85% RH for 1,000 hours, and then the appearance is evaluated. "○" means no occurrence of appearance change, while "x" means occurrence of appearance change such as corrosion.
(4) Hardness
Each of the resultant solar control glasses is subjected to pencil hardness test according to JIS K 5600 (1999). "○" means evaluation of more than HB while "x" means evaluation of less than HB.
(C) Evaluation Result
Evaluation result of the glass samples is shown in Table 4.

TABLE 4

|  | Ex. 8 | Ex. 9 | Ex. 10 | Co. Ex. 12 | Co. Ex. 13 | Co. Ex. 14 |
|---|---|---|---|---|---|---|
| Surface protection layer | 0.2 μm | 2.0 μm | 0.2 μm | None | 3.0 μm | None |
| Heat-ray reflection layer | Conductive polymer | Conductive polymer | Conductive polymer | Conductive polymer | Conductive polymer | ITO/Ag |
| Heat-ray shielding layer | None | None | Cs/W oxide | None | None | None |
| Emissivity | 0.55 | 0.60 | 0.55 | 0.53 | 0.85 | 0.20 |
| Solar transmission (%) | 70 | 70 | 30 | 70 | 70 | 40 |
| Weather resistance | ○ | ○ | ○ | x (white turbidity) | ○ | x (corrosion) |
| Hardness | ○ | ○ | x | ○ | ○ | x |

As apparent from Table 4, the solar control glasses having a surface protection layer of not more than 2.0 μm thickness according to Examples 8 and 9 show excellent thermal insulating properties with retaining comparable emissivity to that in the solar control glass having no surface protection layer of Comparison Example 12. Further though the solar control glass of Comparison Example 12 shows poor weather resistance and hardness, the solar control glasses of Examples 8 and 9 are good in weather resistance and hardness, which indicates that the glasses are prevented from physical damages and water. In contrast, the solar control glasses having a surface protection layer of 3.0 μm thickness of Comparison Example 13 show enhanced emissivity to indicate inhibition of the thermal insulating properties of the heat-ray shielding layer.

Further, the solar control glasses having a heat-ray shielding layer of Example 10 shows reduced solar transmission compared with those of Examples 8 and 9 and therefore is capable of shielding a wide wavelength range of infrared rays. Moreover, the solar control glass having ITO/Ag film as a heat-ray shielding layer of Comparison Example 14 shows poor weather resistance, and therefore the solar control double glasses of Examples 8 to 10 have an advantage from this viewpoint compared with one of Comparison Example 14.

Meanwhile, the present invention is not restricted to the embodiments and Examples described previously, and therefore can be varied in wide range as long as satisfies the scope of the gist of the invention.

INDUSTRIAL APPLICABILITY

It is possible to provide a solar control double glass that can retain a reduced air-conditioning loads of buildings, vehicles such as bus and automobile, and rail cars such as electric car for long time period.

EXPLANATION OF REFERENCE NUMBER

30 Solar control glass
21, 37 Glass plate
22 Adhesive layer
23 Transparent plastic film
24 Heat-ray reflection layer
25 Heat-ray shielding layer
26 Surface protection layer
38 Hollow layer
39 Spacer
40 Double glass

What is claimed is:

1. A solar control double glass which comprises a solar control glass having a glass plate and a heat-ray reflection layer comprising an electrically-conductive polymer provided thereon and another glass plate, the solar control glass and the another glass being arranged at an interval such that the heat-ray reflection layer faces the another glass and the interval forming a hollow layer, wherein the heat-ray reflection layer has a surface resistivity of not more than 10,000Ω/□, wherein the electrically-conductive polymer is a polythiophene derivative comprising a recurring unit represented by the following formula (I):

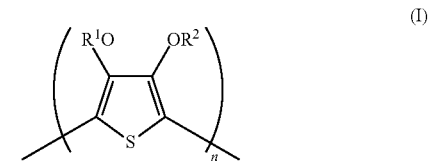

in which $R^1$ and $R^2$ independently represent a hydrogen atom or an alkyl group of 1 to 4 carbon atoms, or $R^1$ and $R^2$ combine with each other to form an alkylene group of 1 to 4 carbon atoms which may be arbitrarily substituted, and n is an integer of 50 to 1,000, wherein the heat-ray reflection layer has a thickness of 100 to 450 nm, and wherein the heat-ray reflection layer is formed on the topmost surface of the solar control glass.

2. A solar control double glass as defined in claim 1, wherein the solar control glass is obtained by combining a plastic film having a heat-ray reflection layer provided thereon with a glass plate through an adhesive layer.

3. A solar control double glass as defined in claim 2, wherein the adhesive layer comprises ethylene-vinyl acetate copolymer.

4. A solar control double glass as defined in claim 1, wherein the solar control glass comprises further a heat-ray shielding layer comprising a resin composition comprising a heat-ray shielding agent other than the electrically-conductive polymer and a binder.

5. A solar control double glass as defined in claim 4, wherein the heat-ray shielding agent is tungsten oxide and/or composite tungsten oxide.

6. A near-infrared shielding material defined in claim 5, wherein the tungsten oxide is represented by a general formula $W_yO_z$ wherein W represents tungsten, O represents oxygen, and y and z satisfy the condition of $2.2 \leq z/y \leq 2.999$, and the composite tungsten oxide is represented by a general formula $M_xW_yO_z$ wherein M represents at least one element selected from H, He, alkaline metals, alkaline-earth metals, rare-earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi and I, W represents tungsten, O represents oxygen, and x, y and z satisfy the conditions of $0.001 \leq x/y \leq 1$ and $2.2 \leq z/y \leq 3$.

7. A solar control double glass as defined in claim 4, wherein the heat-ray shielding layer has a thickness of 0.5 to 50 μm.

8. A solar control double glass as defined in claim 1, wherein the heat-ray reflection layer has a surface resistivity of not more than 5,000Ω/□.

* * * * *